US 8,848,248 B2

(12) United States Patent
Kawabe

(10) Patent No.: US 8,848,248 B2
(45) Date of Patent: Sep. 30, 2014

(54) GRADATION CORRECTION DEVICE FOR GENERATING GRADATION CORRECTION DATA IN ACCORDANCE WITH DENSITY DATA OBTAINED BY READING CONTROL STRIP, AND PRINTING SYSTEM HAVING THE SAME

(71) Applicant: Toru Kawabe, Hachioji (JP)

(72) Inventor: Toru Kawabe, Hachioji (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 8 days.

(21) Appl. No.: 13/852,117

(22) Filed: Mar. 28, 2013

(65) Prior Publication Data

US 2013/0265609 A1 Oct. 10, 2013

(30) Foreign Application Priority Data

Apr. 6, 2012 (JP) .................................. 2012-87524

(51) Int. Cl.
H04N 1/407 (2006.01)
H04N 1/60 (2006.01)
G06K 15/02 (2006.01)
B41J 29/393 (2006.01)

(52) U.S. Cl.
CPC ............ G06K 15/027 (2013.01); H04N 1/6033 (2013.01); B41J 29/393 (2013.01)
USPC ......... 358/3.01; 358/3.21; 358/504; 358/521; 358/406

(58) Field of Classification Search
None
See application file for complete search history.

(56) References Cited

U.S. PATENT DOCUMENTS

| 6,061,144 | A  | * | 5/2000  | Mamizuka ..................... 358/519 |
| 6,147,698 | A  | * | 11/2000 | Zable et al. ..................... 399/72 |
| 6,366,306 | B1 | * | 4/2002  | Fukuda .......................... 347/172 |
| 6,515,769 | B1 | * | 2/2003  | Ikeda et al. ..................... 358/3.1 |
| 7,202,973 | B2 | * | 4/2007  | Yamamoto et al. ............. 358/1.9 |
| 7,206,097 | B2 | * | 4/2007  | Takeda et al. .................. 358/504 |
| 7,460,706 | B2 | * | 12/2008 | Doumoto et al. ............. 382/167 |
| 8,630,486 | B2 | * | 1/2014  | Fuchsenthaler ............... 358/406 |
| 8,681,403 | B1 | * | 3/2014  | Coon ............................ 358/504 |

(Continued)

FOREIGN PATENT DOCUMENTS

| JP | 2002-116586   | 4/2002 |
| JP | 2003-103762   | 4/2003 |
| JP | 2012-87524 A  | 4/2012 |

OTHER PUBLICATIONS

Office Action dated Jun. 17, 2014 from corresponding Japanese Patent Application No. JP2012-087524.

*Primary Examiner* — Scott A Rogers
(74) *Attorney, Agent, or Firm* — Lucas & Mercanti, LLP

(57) ABSTRACT

Disclosed is a gradation correction device in which the control strip has white or light-colored end patches and has at least one reference point at each of both ends of the control strip, which is defined by two straight lines including a fine line drawn on at least a part of a peripheral edge of each end patch except a border between the end patch and an adjacent patch which is adjacent to the end patch, and in which the gradation correction device detects the reference point at each of the both end portions of the control strip in the read image data, and obtains the density data of each patch by specifying a position of each patch in the control strip in the read image data in accordance with the detected reference point.

16 Claims, 30 Drawing Sheets

(56) References Cited

U.S. PATENT DOCUMENTS

| | | | |
|---|---|---|---|
| 8,749,857 B2 * | 6/2014 | Kazama et al. | 358/518 |
| 2005/0105112 A1 * | 5/2005 | Fukuda | 358/504 |
| 2006/0152776 A1 * | 7/2006 | Bailey | 358/504 |
| 2012/0050771 A1 * | 3/2012 | Sakatani | 358/1.9 |
| 2012/0250044 A1 * | 10/2012 | Teraue | 358/1.9 |
| 2013/0148138 A1 * | 6/2013 | Tanaka et al. | 358/1.9 |

* cited by examiner

FIG.29

$$\begin{pmatrix} x'_1 \\ x'_2 \\ x'_3 \\ x'_4 \\ y'_1 \\ y'_2 \\ y'_3 \\ y'_4 \end{pmatrix} = \begin{pmatrix} x_1 & y_1 & 1 & 0 & 0 & 0 & -x'_1 x_1 & -x'_1 y_1 \\ x_2 & y_2 & 1 & 0 & 0 & 0 & -x'_2 x_2 & -x'_2 y_2 \\ x_3 & y_3 & 1 & 0 & 0 & 0 & -x'_3 x_3 & -x'_3 y_3 \\ x_4 & y_4 & 1 & 0 & 0 & 0 & -x'_4 x_4 & -x'_4 y_4 \\ 0 & 0 & 0 & x_1 & y_1 & 1 & -y'_1 x_1 & -y'_1 y_1 \\ 0 & 0 & 0 & x_2 & y_2 & 1 & -y'_2 x_2 & -y'_2 y_2 \\ 0 & 0 & 0 & x_3 & y_3 & 1 & -y'_3 x_3 & -y'_3 y_3 \\ 0 & 0 & 0 & x_4 & y_4 & 1 & -y'_4 x_4 & -y'_4 y_4 \end{pmatrix} \begin{pmatrix} a_1 \\ a_2 \\ a_3 \\ a_4 \\ a_5 \\ a_6 \\ a_7 \\ a_8 \end{pmatrix}$$

$$\begin{pmatrix} a_1 \\ a_2 \\ a_3 \\ a_4 \\ a_5 \\ a_6 \\ a_7 \\ a_8 \end{pmatrix} = \begin{pmatrix} x_1 & y_1 & 1 & 0 & 0 & 0 & -x'_1 x_1 & -x'_1 y_1 \\ x_2 & y_2 & 1 & 0 & 0 & 0 & -x'_2 x_2 & -x'_2 y_2 \\ x_3 & y_3 & 1 & 0 & 0 & 0 & -x'_3 x_3 & -x'_3 y_3 \\ x_4 & y_4 & 1 & 0 & 0 & 0 & -x'_4 x_4 & -x'_4 y_4 \\ 0 & 0 & 0 & x_1 & y_1 & 1 & -y'_1 x_1 & -y'_1 y_1 \\ 0 & 0 & 0 & x_2 & y_2 & 1 & -y'_2 x_2 & -y'_2 y_2 \\ 0 & 0 & 0 & x_3 & y_3 & 1 & -y'_3 x_3 & -y'_3 y_3 \\ 0 & 0 & 0 & x_4 & y_4 & 1 & -y'_4 x_4 & -y'_4 y_4 \end{pmatrix}^{-1} \begin{pmatrix} x'_1 \\ x'_2 \\ x'_3 \\ x'_4 \\ y'_1 \\ y'_2 \\ y'_3 \\ y'_4 \end{pmatrix}$$

CALCULATING EXPRESSIONS
FOR PROJECTIVE
TRANSFORMATION
COEFFICIENTS

GRADATION CORRECTION DEVICE FOR GENERATING GRADATION CORRECTION DATA IN ACCORDANCE WITH DENSITY DATA OBTAINED BY READING CONTROL STRIP, AND PRINTING SYSTEM HAVING THE SAME

BACKGROUND OF THE INVENTION

1. Field of the Invention

The present invention relates to a gradation correction device for instructing a printing apparatus to print a control strip formed by linearly arranging a plurality of patches on an end portion of a paper sheet, and for generating gradation correction data in accordance with density data obtained by reading the control strip; and a printing system having the gradation correction device.

2. Description of Related Art

In a printing system, stable gradation reproducibility in which the same printed result can be always obtained from the same printing data is required. In particular, in a printing system that performs high-speed printing in large amount, the above stable gradation reproducibility is strongly required.

In a general printing system using an electrophotographic process or the like, the output characteristics are changed due to environmental conditions, change over time in continuous printing, and individual difference between systems. For this reason, generally, by measuring the output characteristics to feed back the measured characteristics to the gradation correction, the output characteristics become constant.

In the printing system that performs the high-speed printing in large amount, in order to maintain the processing ability, it is not preferable to print a test chart separately from a printed document. Therefore, by printing a control strip in a space of a cut-off region of the printed document and reading the control strip, the gradation correction is finely performed.

For example, each patch position in the control strip on the paper sheet is detected in accordance with the relative position to reference marks having a cross shape or the like, which are printed in the vicinity of the control strip (See Japanese Patent Application Publication No. 2003-103762).

In many cases, in the space of the cut-off region, crop marks which are the indication of a cut-off position are arranged. Further, in some cases, another test chart for the correction other than the gradation correction is printed. Therefore, the area that can be allocated for the control strip is restricted.

Meanwhile, it is required to arrange the control strip which is printed so as to have a large area for each patch because of the particle property of the toner used for the printed document, the stability of the printing (the irregularity in the patch) and the like, and which has fine gradation steps and is expressed by a multi-color system having not only the primary colors, but also the secondary colors and the tertiary colors. In order to meet the above requirements, a large paper area is required for the control strip.

For this reason, as disclosed in Japanese Patent Application Publication No. 2003-103762, in a method of additionally arranging the reference marks in the vicinity of each control strip, an extra arrangement space for the reference marks is needed. Accordingly, the area that can be allocated for the control strip is decreased.

Further, because the paper sheet is not precisely fixed and conveyed in the printing of the control strip on the paper sheet and in the reading of the printed control strip, the problems such as the shift of the position, the inclination, the extension or the contraction and the deformation of the paper could be caused for the intended control strip. Accordingly, in order to estimate the position of each patch of the control strip in accordance with the positions of the reference marks with high accuracy, it is required to finely arrange the reference marks. However, as the number of the arranged reference marks is increased, the space for arranging the control strip is not enough. Accordingly, the number of types of the control strips that can be arranged is decreased, and the gradation correction cannot be performed with high accuracy.

Further, there could be a case where the relation between resolution at the time of the printing and the resolution at the time of the reading are not constant, or a case where due to a system configuration, the detailed arrangement positional information of the control strip, the resolution information at the printing or the reading, and the like cannot be obtained or is unknown. It is assumed that there is no information other than the read image data.

However, in case of the method in which the patch is read on the assumption that the patch exists at a predetermined relative position to the reference marks, the information indicating the positional relation between the reference marks and the patch of the control strip, the resolution information, and the like are required. Accordingly, in a system that cannot obtain the above information, the position of each patch cannot be specified.

SUMMARY

To achieve at least one of the abovementioned objects, a gradation correction device reflecting one aspect of the present invention, has the functions: to instruct a printing apparatus to print an image in which a control strip formed by linearly arranging a plurality of patches having different densities is located at an end portion of a paper sheet; to obtain density data of each patch of the control strip by analyzing read image data obtained by instructing a reading device to read the image on the paper sheet and to generate gradation correction data in accordance with the density data, which is used in the printing apparatus, wherein the control strip has white or light-colored end patches arranged at both ends in a longitudinal direction of the control strip, and has at least one reference point at each of both end portions of the control strip in the longitudinal direction, the reference point being defined by two straight lines including a fine line drawn on at least a part of a peripheral edge of each end patch except a border between the end patch and an adjacent patch which is adjacent to the end patch, and wherein the gradation correction device detects the reference point at each of the both end portions of the control strip in the read image data, and obtains the density data of each patch by specifying a position of each patch in the control strip in the read image data in accordance with the detected reference point.

Preferably, the fine line is a straight line that is positioned at each of end positions in the longitudinal direction of the control strip, and that extends in a direction perpendicular to the longitudinal direction, and wherein the reference point is defined as an intersection point between the fine line and a perpendicular fine line which is perpendicular to the fine line, or an intersection point at which an extended line of one of the fine line and the perpendicular fine line intersects with the other line of the fine line and the perpendicular fine line or with an extended line of the other line.

Preferably, the gradation connection device detects the reference point in accordance with a detecting method comprising:

calculating approximate end positions in a width direction of the control strip, the width direction being perpendicular to the longitudinal direction;

specifying the end positions in the longitudinal direction of the control strip by analyzing an area in the width direction, the area being defined by the calculated approximate end positions;

specifying end positions in the width direction of the control strip by analyzing areas in vicinity of the specified end positions in the longitudinal direction; and specifying each position of the reference points in accordance with each position of four corners of the control strip, which are determined by the specified end positions in the width direction and the specified end positions in the longitudinal direction.

Preferably, the specifying of the end positions in the longitudinal direction is carried out by:

detecting a position of an edge in the control strip, in vicinity of one end position in the longitudinal direction of the control strip;

detecting a position of the fine line which is closest to the detected position of the edge; and approximately estimating the other end position in the longitudinal direction of the control strip in accordance with a distance between the detected position of the edge and the detected position of the fine line, and design information of the control strip.

Preferably, each of the patches constituting the control strip has a same size, and wherein the design information, includes the number of the patches constituting the control strip, and the gradation correction device approximately estimates the other end position of the control strip in accordance with the distance and the number of the patches.

Preferably, the fine line is a solid line or a dashed line, and in the fine line, not less than one third of pixels of the control strip, which are arranged in the width direction, are high density pixels.

Preferably, the perpendicular fine line is positioned at an end position in a width direction of the control strip.

Preferably, the fine line and two of the perpendicular fine lines form frame lines of each end patch of the control strip.

BRIEF DESCRIPTION OF THE DRAWINGS

The present invention will become more fully understood from the detailed description given hereinafter and the accompanying drawings given by way of illustration only, and thus are not intended as a definition of the limits of the present invention, and wherein:

FIG. 29 is a view illustrating the calculating expressions for the projective transformation coefficients.

DETAILED DESCRIPTION OF PREFERRED EMBODIMENT

Hereinafter, a preferred embodiment of the present invention will be explained with reference to the accompanying drawings.

Figure 1:
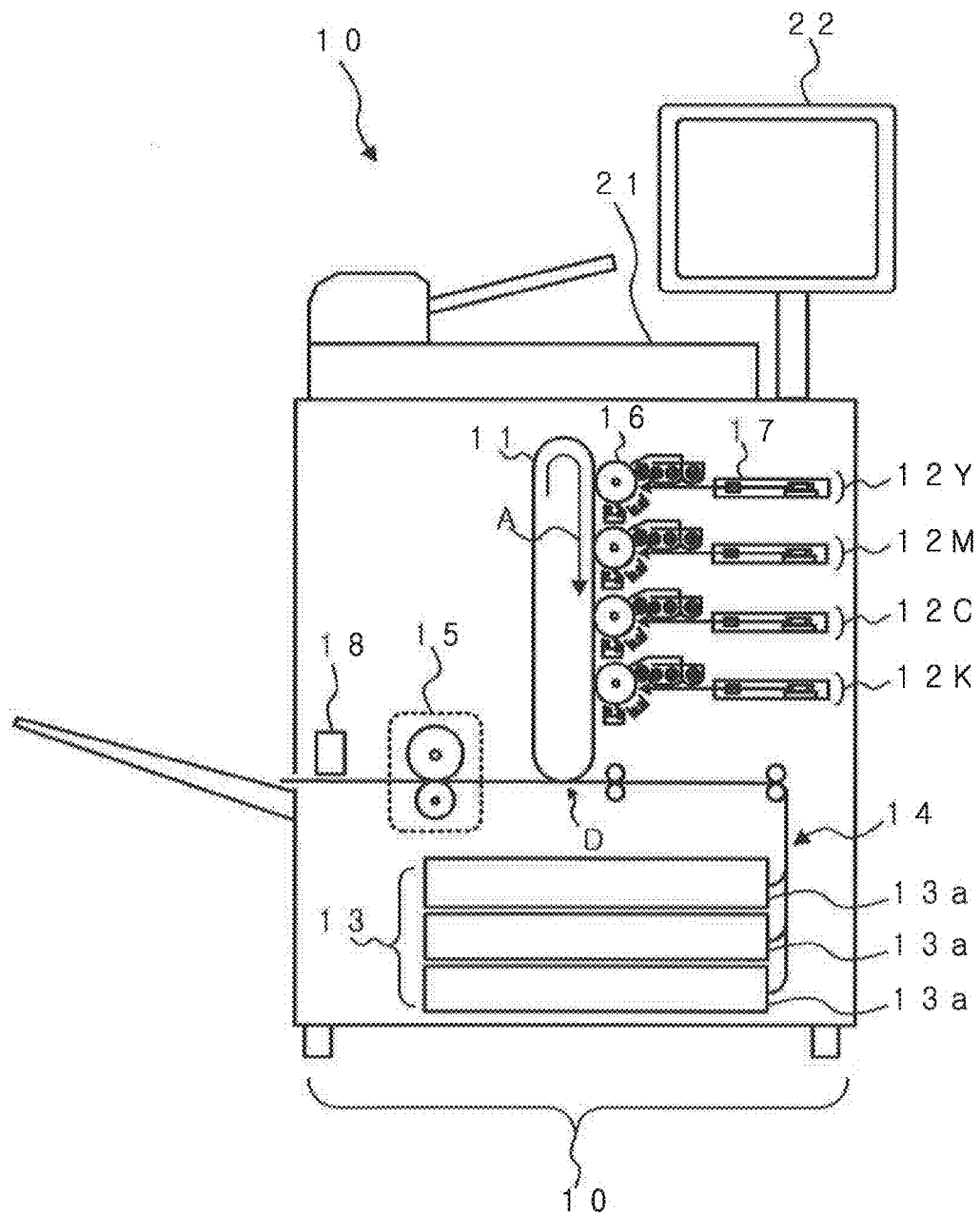
FIG. 1 is an explanatory view schematically illustrating a printing system having a function of a gradation correction device according to the embodiment.

FIG. 1 is an explanatory view schematically illustrating a printing system 10 having a function as a gradation correction device according to the embodiment. The printing system 10 has a printing function of printing out a color image on a paper sheet in accordance with print data input through a network or the like, a copying function of printing out an image on a paper sheet in accordance with image data obtained by optically reading an original, and the like. The printing system 10 does not necessarily perform the color printing, and may be a system that performs the monochrome printing.

The printing system 10 comprises an endless intermediate transfer belt that is bridged annularly and that has a predetermined width, four image forming units 12Y, 12M, 12C and 12K which form single color toner images having the colors of yellow (Y), magenta (M), cyan (C) and black (K), respectively on the intermediate transfer belt 11, a paper feeding unit 13 that feeds paper sheets, a conveying unit 14 that conveys the fed paper sheet, a fixing device 15, a reading unit 18 that optically reads the image printed on the paper sheet, and the like.

The image forming units 12Y, 12M, 12C and 12K use toners of different colors, but have the same structure. Each of the image forming units 12Y, 12M, 12C and 12K comprises a cylindrical photoconductive drum 16 that functions as an electrostatic latent image carrier on which an electrostatic latent image is formed, and comprises a charging device, a developing device, a transferring device, a cleaning device, and the like that are arranged around the photoconductive drum 16. Further, each of the image forming units 12Y, 12M, 12C and 12K has a laser unit 17 that includes a laser diode, a polygon mirror, various types of lenses and mirrors, and the like.

In each of the image forming units 12Y, 12M, 12C and 12K, the photoconductive drum 16 is driven by a driving unit not illustrated in the drawings to be rotated in a predetermined direction. The charging device uniformly charges the photoconductive drum 16. The laser unit 17 scans the photoconductive drum 16 with laser light that is turned on and off in accordance with image data of the corresponding color to form the electrostatic latent image on the surface of the photoconductive drum 16. The developing device visualizes the electrostatic latent image formed on the photoconductive drum 16 by using a toner. The toner image formed on the surface of the photoconductive drum 16 is transferred on the intermediate transfer belt 11 at the position where the photoconductive drum 16 contacts with the intermediate transfer belt 11. The cleaning device removes and collects the toner which remains on the surface of the photoconductive drum 16 by rubbing the remaining toner with a blade or the like after the transfer of the toner image.

The intermediate transfer belt 11 is wound so as to be bridged by a plurality of rollers, and is rotated in the direction of the arrow A in the drawing. In a process of the rotation of the intermediate transfer belt 11, the images (toner images) of the respective colors are formed on the intermediate transfer belt 11 so as to overlap the images in the order of the color Y, the color M, the color C and the color K by the image forming units 12Y, 12K, 12C and 12K. Thereby, the color image is composed. This color image is transferred from the intermediate transfer belt 11 to a paper sheet at a second transferring position D.

The paper feeding unit 13 comprises a plurality of paper feed trays 13a that contain paper sheets used in printing (image forming). The paper feeding unit 13 feeds paper sheets one by one from the selected paper feed tray 13a toward the conveying unit 14. The conveying unit 14 has a function of conveying the paper sheet fed from the paper feed tray 13a so as to pass the paper sheet through the second transferring position D and the fixing device 15, and discharging the paper sheet to a discharge tray through a reading position of the reading device 18. The conveying unit 14 is configured by conveying rollers and a guide unit that form a conveying passage, and by a motor that drives the conveying rollers.

The printing system 10 further comprises a scanner unit 21 that reads an original set by a user, an operation panel unit 22 that receives operation of a user and that displays various types of windows, and the like.

Figure 2:
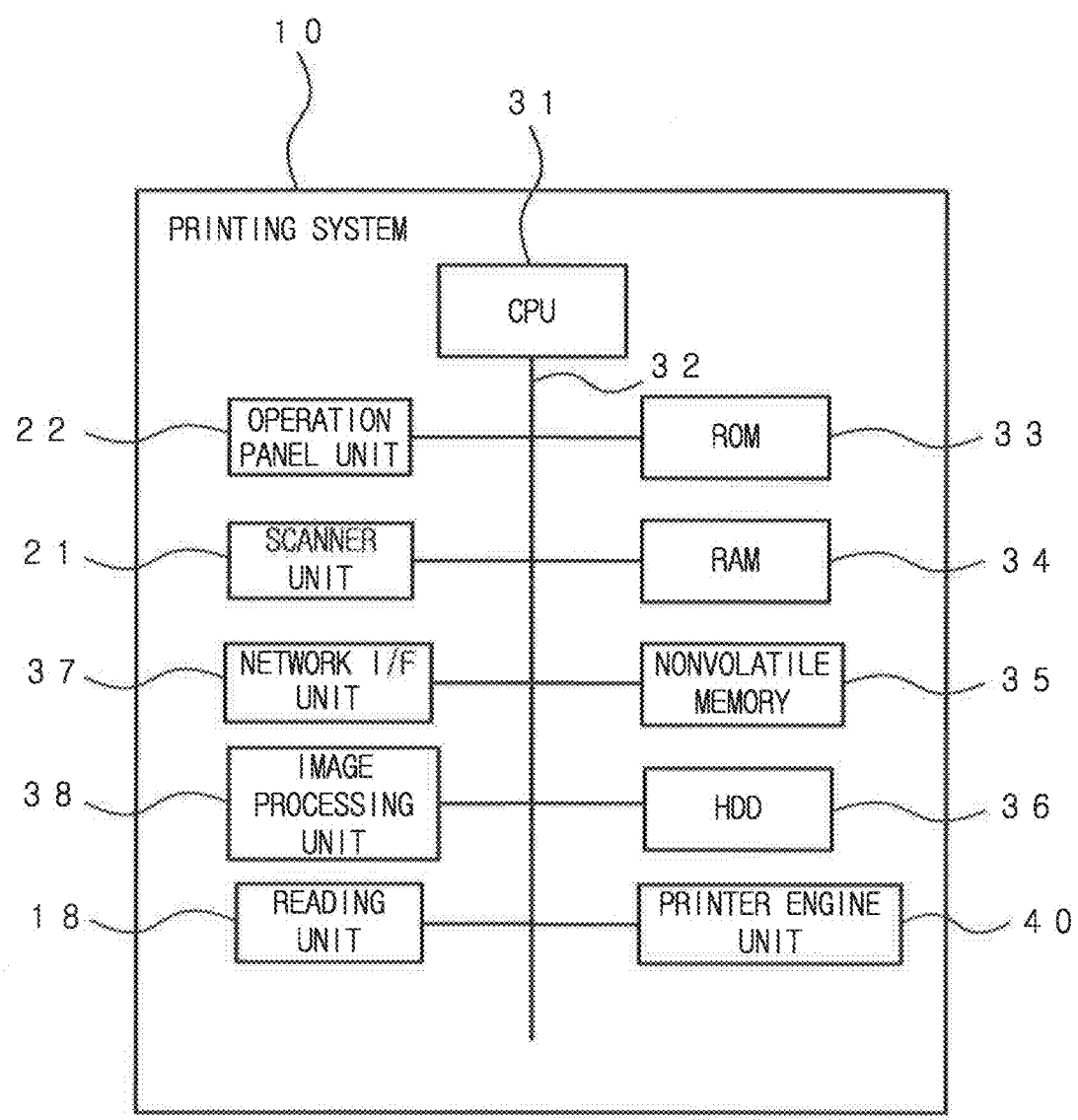
FIG. 2 is a block diagram schematically illustrating an electrical structure of the printing system having the function of the gradation correction device according to the embodiment.

FIG. 2 is a block diagram schematically illustrating an electrical structure of the printing system 10. The printing system 10 comprises a CPU (Central Processing Unit) 31 that controls the whole operation of the printing system 10. The CPU 31 is connected with a ROM (Read On Memory) 33, a RAM (Random Access Memory) 34, and a nonvolatile memory 35, an HDD (hard disk drive) 36, the operation panel unit 22, the scanner unit 21, a network I/F (interface) unit 37, an image processing unit 38, the reading unit 18, a printer engine unit 40, and the like via a bus 32.

By the CPU 31, a middleware, application programs and the like are executed on an OS (Operating System) program as a base. In the ROM 33, various types of programs are stored. By executing the processes by the CPU 31 in accordance with these programs, the functions of the printing system 10 are realized in addition to the operation relating to the gradation correction.

The RAM 34 is used as a work memory that temporarily stores various types of data when the CPU 31 executes the programs, an image memory that stores image data, and the like.

The nonvolatile memory 35 is a rewritable memory (flash memory) in which the contents are stored even if the printing system 10 is turned off. In the nonvolatile memory 35, the unique information of the printing system 10, various types of setting information, and the like.

The HDD 36 is a large-capacity nonvolatile storing device. In the HDD 36, print data, image data, data for printing control strips described later, and the like are stored.

The printer engine unit 40 has a function of printing an image (forming an image) on a paper sheet. The printer engine unit 40 comprises the intermediate transfer belt 11, the image forming units 12Y, 12M, 12C and 12K, the paper feeding unit 13, the conveying unit 14, the fixing device 15, and the like that are illustrated in FIG. 1. The printer engine unit 40 operates on the basis of the control from the CPU 31.

The reading unit 18 comprises a light source for irradiating the paper sheet passing through the reading position with light, a line image sensor for reading an image on the paper sheet line by line in the width direction of the paper sheet by receiving the reflected light from the paper sheet, and the like. The reading unit 18 repeats the operation of reading an image by one line in the width direction (direction perpendicular to the conveying direction) of the paper sheet conveyed by the conveying unit 14. Thereby, the reading unit 18 reads the image formed on the conveyed paper sheet as a two-dimensional image. The reading unit 18 has a reading width which is slightly larger than the maximum width of the paper sheets to be conveyed. The reading unit 18 outputs data having three channels of red R, green G, and blue B.

The operation panel unit 22 comprises a liquid crystal display, a touch panel that is provided on a screen of the liquid crystal display and that detects the coordinate position pressed by a pen, a finger or the like, an operation, switch such as a numerical keypad and a start key, and the like. The operation panel unit 22 displays various types of operation windows, setting windows and system state windows, and receives various types of operations such as job input and setting from a user.

The scanner unit 21 has a function of optically reading an image on the original to obtain image data. The scanner unit 21 comprises a light source for irradiating the original with the light, a line image sensor for reading an image on the original line by line in the width direction of the original by receiving the reflected light, a moving unit for sequentially moving the reading position line by line in the longitudinal direction of the original, an optical system having lenses, mirrors and the like for guiding the reflected light from the original to the line image sensor and focusing the reflected light on the line image sensor, a converting unit for converting an analog image signal outputted from the line image sensor into digital image data, and the like. The scanner unit 21 comprises an automatic document feeder that feeds the original sheet by sheet from a stack of the original set on an original tray to convey the original via the reading position to a paper discharge position.

The network I/F unit 37 communicates with an external device connected via a network such as a LAN (Local Area Network). For example, the network I/F unit 37 receives print data from the external device.

The image processing unit 38 performs the rasterization processing for converting print data into image data, compression/decompression processing of image data and the like, in addition to the processings, such as enlargement/reduction and rotation of the image. The image processing unit 38 carries out the gradation correction process for the image data to be printed out by the printer engine unit 40 in accordance with the gradation correction data.

When the CPU 31 of the printing system 10 instructs the printer engine unit 40 to print an image, the CPU 31 instructs the printer engine unit 40 to print the control strip formed by linearly arranging a plurality of patches having different densities on an end portion of the paper sheet. The CPU 31 obtains the density data of each patch of the control strip by analyzing the read image data obtained by instructing the reading unit 18 to optically read the image on the paper sheet. Further, the CPU 31 generates the gradation correction data in accordance with the obtained density data. Then, in accordance with the gradation correction data, the CPU 31 performs the gradation correction in the subsequent printing.

Figure 3:
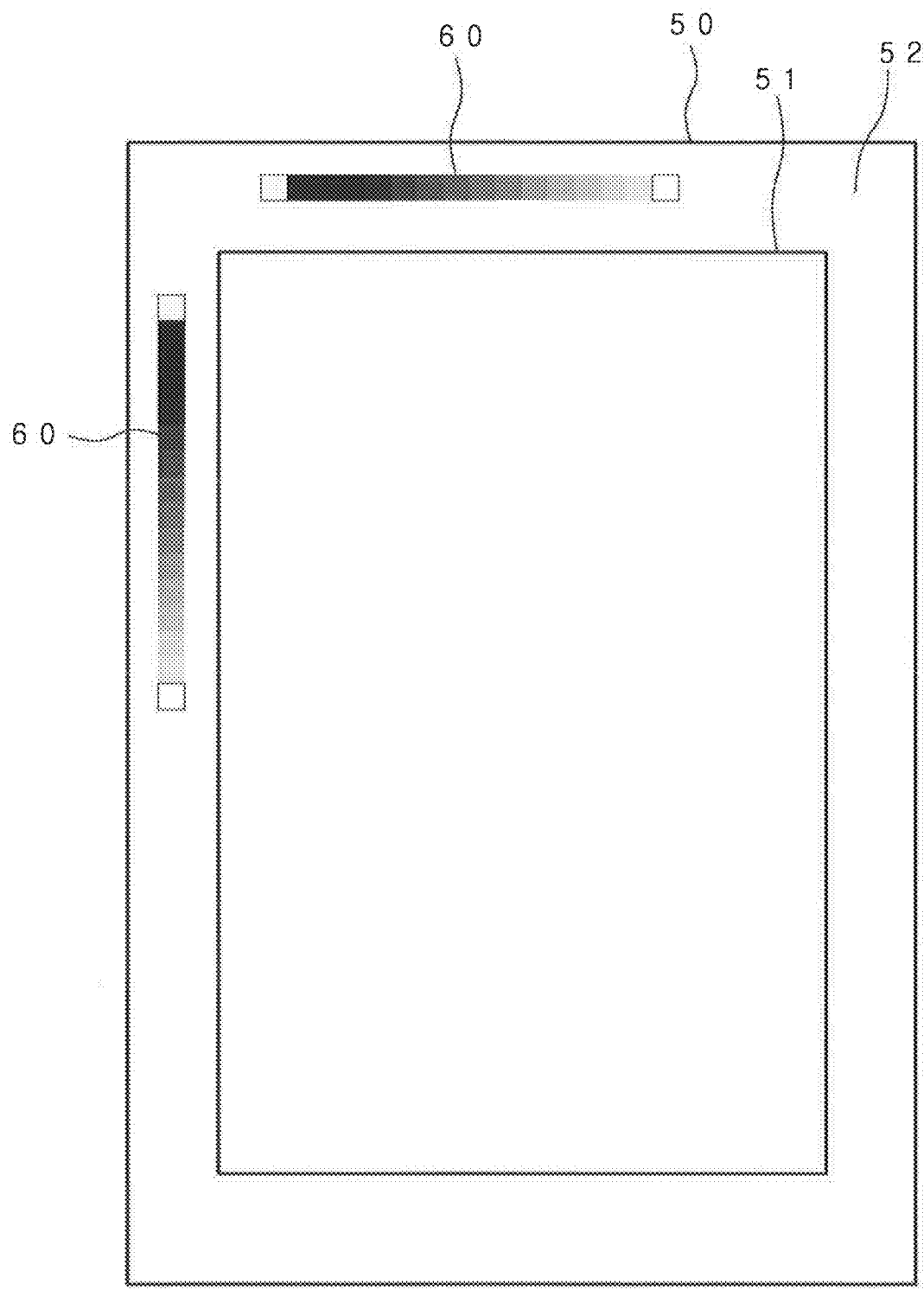
FIG. 3 is a plan view illustrating one example of a paper sheet in which the control strips are printed on the end portion.

FIG. 3 shows one example of a paper sheet 50 in which the control strips 60 are printed on the end portion. In the center part of the paper sheet 50, there is an effective region 51 where an image or the like is printed in accordance with print data by the print instruction from the external device. An outside of the effective region 51 (an end portion of the paper sheet) is a margin region 52. In the margin region 52, a plurality of control strips 60 are printed along the edge of the paper sheet. In the margin region 52, in addition to the control strips 60, crop marks for determining the cutting position and the like are printed, but are omitted in the drawings.

Figure 4:
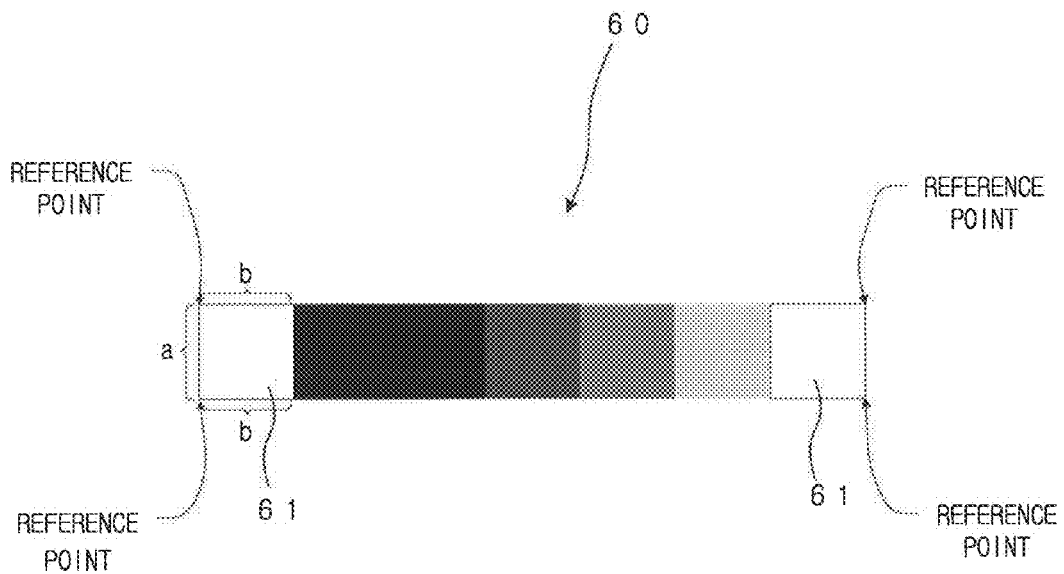
FIG. 4 is an explanatory view illustrating one example of the control strip.

FIG. 4 shows one example of the control strip 60. The control strip 60 is a gradation test image in which a plurality of types of patches having different densities are linearly and continuously arranged. In this example, each patch is a square and has the same size. The patches arranged at both ends in the longitudinal direction (patch arrangement direction) of the control strip 60 are white or light-colored patches. The patches arranged at the both ends are referred to as end patches 61.

At a peripheral edge of each end patch 61, at least one reference point for specifying the position of the control strip 60 is defined. The reference point is defined by an intersection point between two straight lines including a fine line drawn on the peripheral edge of the end patch 61. The two straight lines do not necessarily need to intersect with each other, and the extended line of one of the two straight lines may intersect with the other line or the extended lines of both of the two straight lines may intersect with each other. The two straight lines do not necessarily need to intersect perpendicularly to each other, and may obliquely intersect with each other. The two straight lines are formed by pixels having high density.

In the control strip 60 shown in FIG. 4, the fine frame lines are drawn on the peripheral edge of each square end patch 61. The corners (corners positioned at four corners of the entire control strip 60) of the frame are set to the reference points. Each of the reference points is defined by the intersection point between the fine line "a" and the perpendicular fine line "b" which is perpendicular to the fine line "a". The fine line "a" is positioned at each end of the control strip 60 in the longitudinal direction and extends in a direction (width direction) perpendicular to the longitudinal direction of the control strip 60. In FIG. 4, among the frame lines of the end patch 61, the side positioned at the end of the control strip 60 in the longitudinal direction is the fine line "a", and the two sides which are along the longitudinal direction of the control strip 60 are the perpendicular fine lines "b".

Figure 5A:
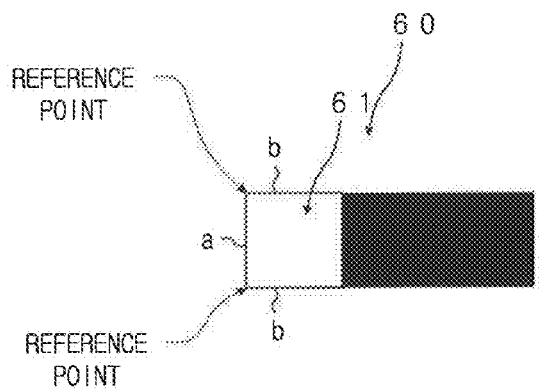
FIGS. 5A to 5D are views illustrating various forms for defining the reference point(s) by the intersection point(s) between two straight lines including a fine line drawn on the peripheral edge of the end patch.

FIGS. 5A to 5D and FIGS. 6A to 6D illustrate various forms for defining the reference point(s) by the intersection point(s) between the two straight lines including the fine line drawn on the peripheral edge of the end patch 61. In FIGS. 5A to 5D and FIGS. 6A to 6D, only one end side of the control strip 60 is illustrated. In FIG. 5A, the reference points are defined by the same method shown in FIG. 4. By drawing the fine frame lines (the fine line "a" and the two perpendicular fine lines "b") on the peripheral edge of the end patch 61, the corners are formed at the end of the control strip 60, and the positions of the corners are set to the reference points. The frame lines are drawn by the solid lines.

Figure 5B:
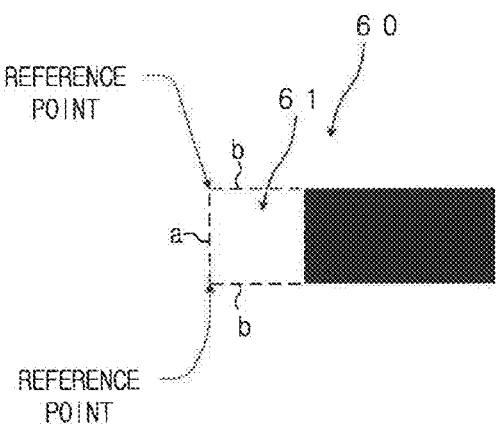

FIG. 5B shows an example in which the frame lines (the fine line "a" and the two perpendicular fine lines "b") are drawn by the dashed lines as compared with FIG. 5A. In each of the fine line "a" and the perpendicular fine lines "b", one third or more of the length of one side of the end patch 61 becomes effective pixels.

Figure 5C:
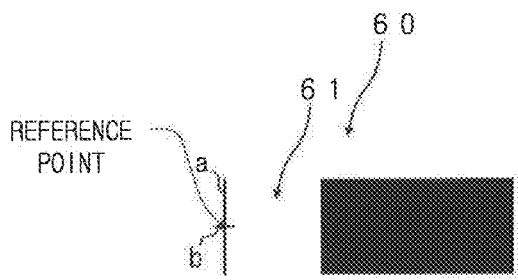

FIG. 5C shows an example in which one reference point is provided at each end of the control strip 60. In this example, the reference point is defined by the intersection point between the fine line "a" which is positioned at the end of the control strip 60 in the longitudinal direction and which is perpendicular to the longitudinal direction of the control strip 60, and the short perpendicular fine line "b" perpendicular to the fine line "a". By providing a plurality of the above perpendicular fine lines "b", a plurality of the reference points may be defined. In this example, the perpendicular fine line "b" intersects with the fine line "a" at the middle of the fine line "a". However, the perpendicular fine line "b" may be shifted in the direction perpendicular to the longitudinal direction of the control strip 60.

Figure 5D:
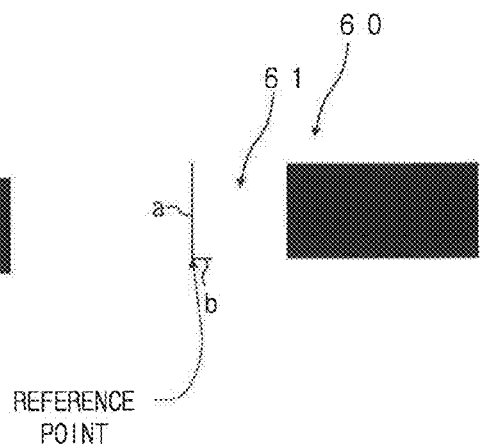

FIG. 5D also shows an example in which one reference point is provided at each end of the control strip 60. In FIG. 5D, one of the corners of the frame is set to the reference point. The fine line "a" is connected to the perpendicular fine line "b" so as to form an L-shape. The corner of the L-shape is the reference point. By providing the perpendicular fine line "b" at the other end of the fine line "a", two reference points may be defined.

Figure 6A:
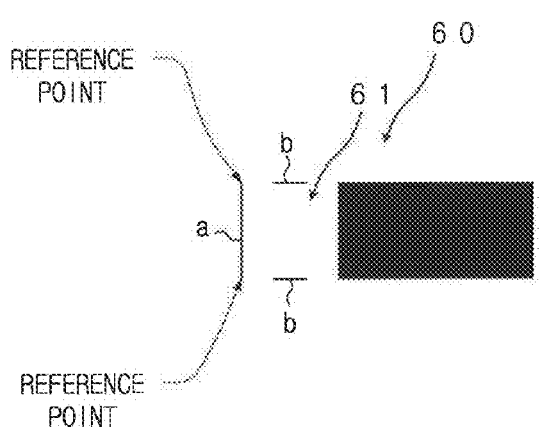
FIGS. 6A to 6D are views illustrating various forms for defining the reference point(s) by the intersection point(s) between two straight lines including a fine line drawn on the peripheral edge of the end patch.

FIG. 6A shows an example in which the fine line "a" does not intersect with the perpendicular fine line "b". An intersection point between the extended line of the perpendicular fine line "b" and the fine line "a" is set to the reference point.

Figure 6B:
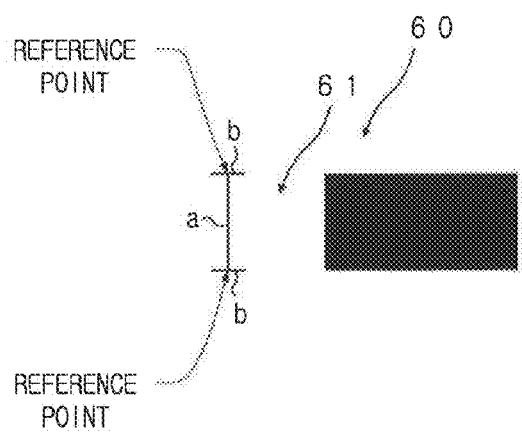

FIG. 6B shows a case in which the perpendicular fine lines "b" are positioned so as to connect with the both ends of the fine line "a", and the perpendicular fine lines "b" extend slightly from the fine line "a" externally and internally in the longitudinal direction of the control strip 60.

Figure 6C:
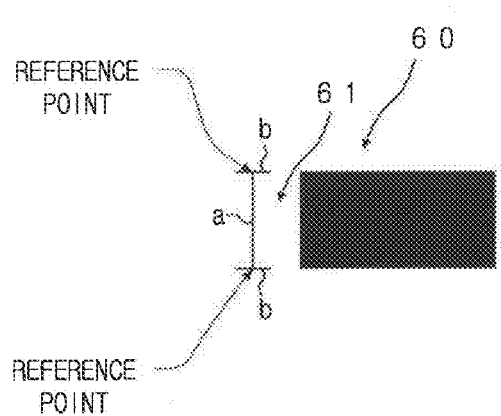
Figure 6D:
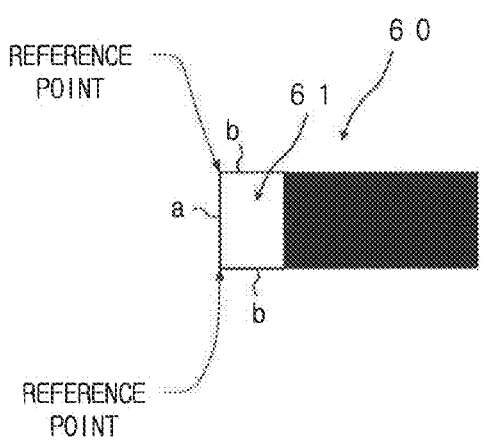

FIGS. 6C and 6D illustrate examples in which the end patch 61 is shorter than the other patches in the longitudinal direction of the control strip 60. The end patch 61 is smaller than the other patches.

Next, the gradation correction operation performed by the printing system 10 will be described.

Figure 7:
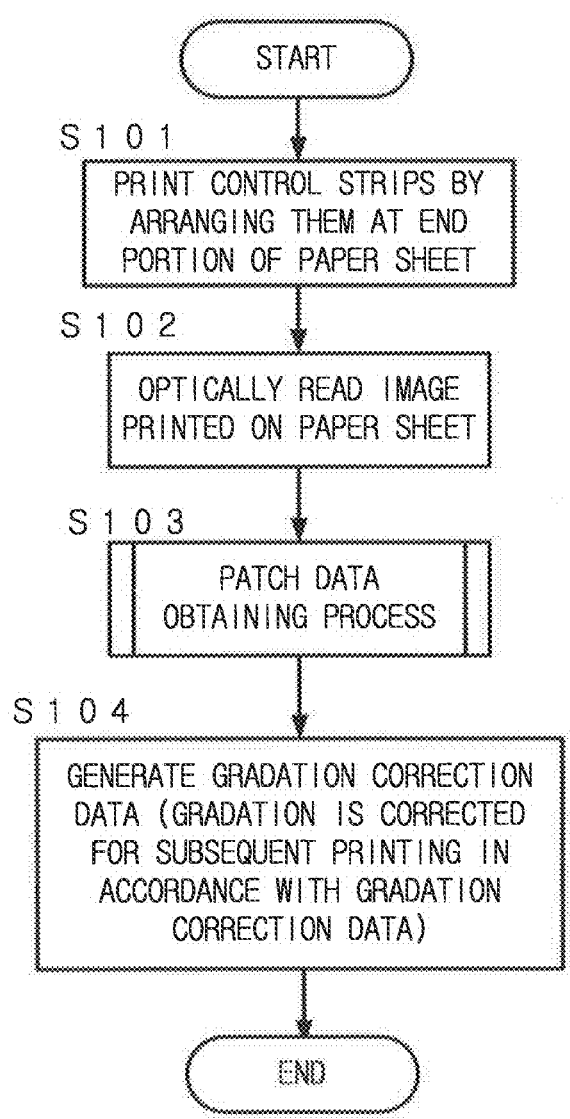
FIG. 7 is a flowchart illustrating the whole gradation correction operation performed by the printing system.

FIG. 7 shows the flowchart of the whole gradation correction operation performed by the printing system 10. When the printing system 10 prints an image in accordance with the printing instruction from the external terminal or the like, the printing system 10 prints an image in which the image to be printed in accordance with the printing instruction is arranged in the effective region 51 (See FIG. 3) of the paper sheet and the control strips 60 are arranged around the effective region 51 (at the predetermined positions in the end portion of the paper sheet), by using the printer engine unit 40 (Step S101). While the paper sheet is conveyed toward the discharge tray, the printing system 10 obtains the image data (read image data) by optically reading the image on the paper sheet with the reading unit 18 (Step S102).

In the above case, the image is read while the printed paper sheet is conveyed toward the discharge tray. However, another reading device having the function of the reading unit 18 may read the image on the printed paper sheet and the read image data may be input into the printing system 10.

Next, the CPU 31 of the printing system 10 performs the patch data obtaining process for obtaining the density data of each patch of the control strip 60 by analyzing the read image data and specifying the position of each patch of the control strip 60 (Step S103). Details of this process will be described below.

Next, in accordance with the density data obtained by the patch data obtaining process, the CPU 31 generates and stores the gradation correction data (Step S104). In accordance with the original density of each of the patches constituting the control strip 60, and the density data of each patch obtained by the patch data obtaining process, the CPU 31 generates the gradation correction data for correcting the image data to be transmitted to the printer engine unit 40 so as to reproduce the original density in the printing, which is indicated by the image data. In the subsequent printing, the printing system 10 performs the printing by carrying out the gradation correction using the gradation correction data.

Figure 8:
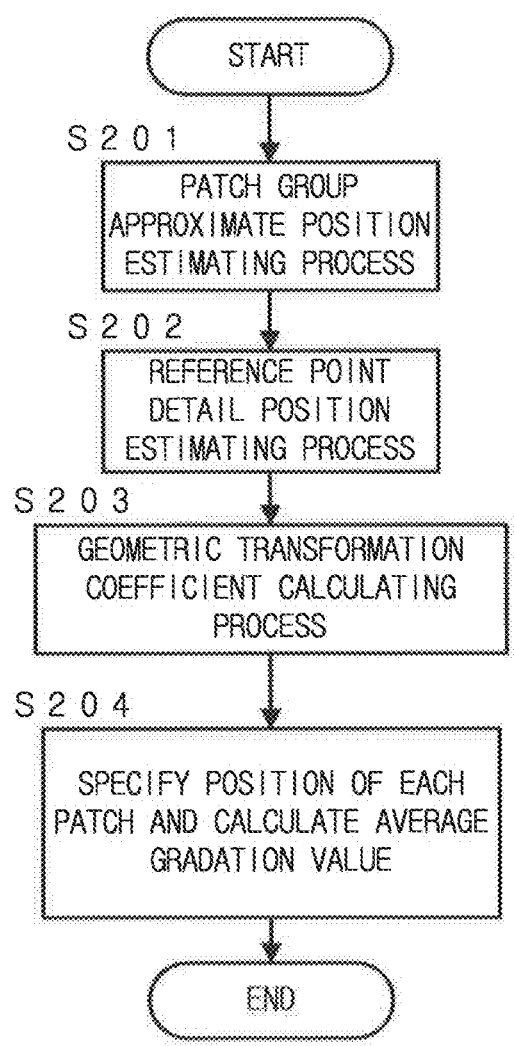
FIG. 8 is a flowchart illustrating a patch data obtaining process (Step S103 of FIG. 7)

FIG. 8 shows the flowchart of the patch data obtaining process (Step S103 of FIG. 7). The CPU 31 analyzes the read image data and estimates the approximate position of the control strip 60 (also referred to as the patch group) arranged at the end portion of the paper sheet (Step S201).

The approximate position of the reference point can be estimated in accordance with the approximate position of the control strip 60. Accordingly, the CPU 31 analyzes the position of the reference point in detail by limiting the area in which the reference point could exist, and estimates the detail position of the reference point (Step S202).

Figure 9:
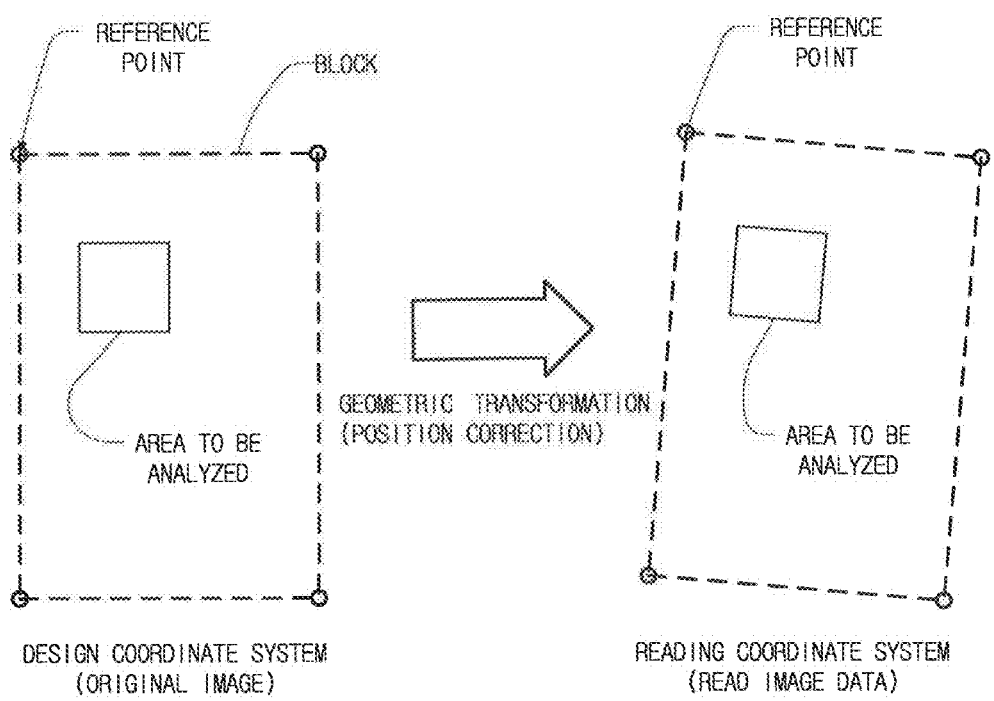
FIG. 9 is an explanatory view illustrating the situation in which the coordinate system is transformed by the geometric transformation.

For example, the reference points are arranged at the four corners of the control strip 60. Accordingly, as illustrated in FIG. 9, from the relation between the position of the reference point on the design coordinate and the position of the reference point in the read image data, the CPU 31 projects the position of the control strip 60 on the design coordinate and the position of each patch on the design coordinate by the geometric transformation so as to correspond to the inclination of the read image data, which is caused, for example, by incorrectly conveying the paper sheet. In Step S203, coefficients for the above projection are calculated.

Next, the CPU 31 projects the position of the control strip 60 and the position of each patch on the design coordinate system, to the read image data on the reading coordinate system and specifies the position of each patch on the read image data. Then, the CPU 31 obtains the density data (average gradation value) of each patch (Step S204). The process is ended.

As illustrated in FIG. 9, in case that one control strip 60 (region surrounded by the four reference points) is considered as one block, the CPU 31 performs the geometric transformation for one block. In this geometric transformation, the throughput for the geometric transformation can be small, and the geometric transformation, can be performed for each control strip more precisely. In other words, when a plurality of the control strips are arranged at end portion of the paper sheet, there is some possibility that the inclination or the distortion of the paper sheet slightly differ according to the arrangement positions of the control strips (for example, the difference in the inclination or the distortion between the front edge and the rear edge of the paper sheet). Accordingly, by performing the geometric transformation for each control strip in accordance with the reference points at the four corners of the control strip, the projection can be performed more precisely.

Figure 10:
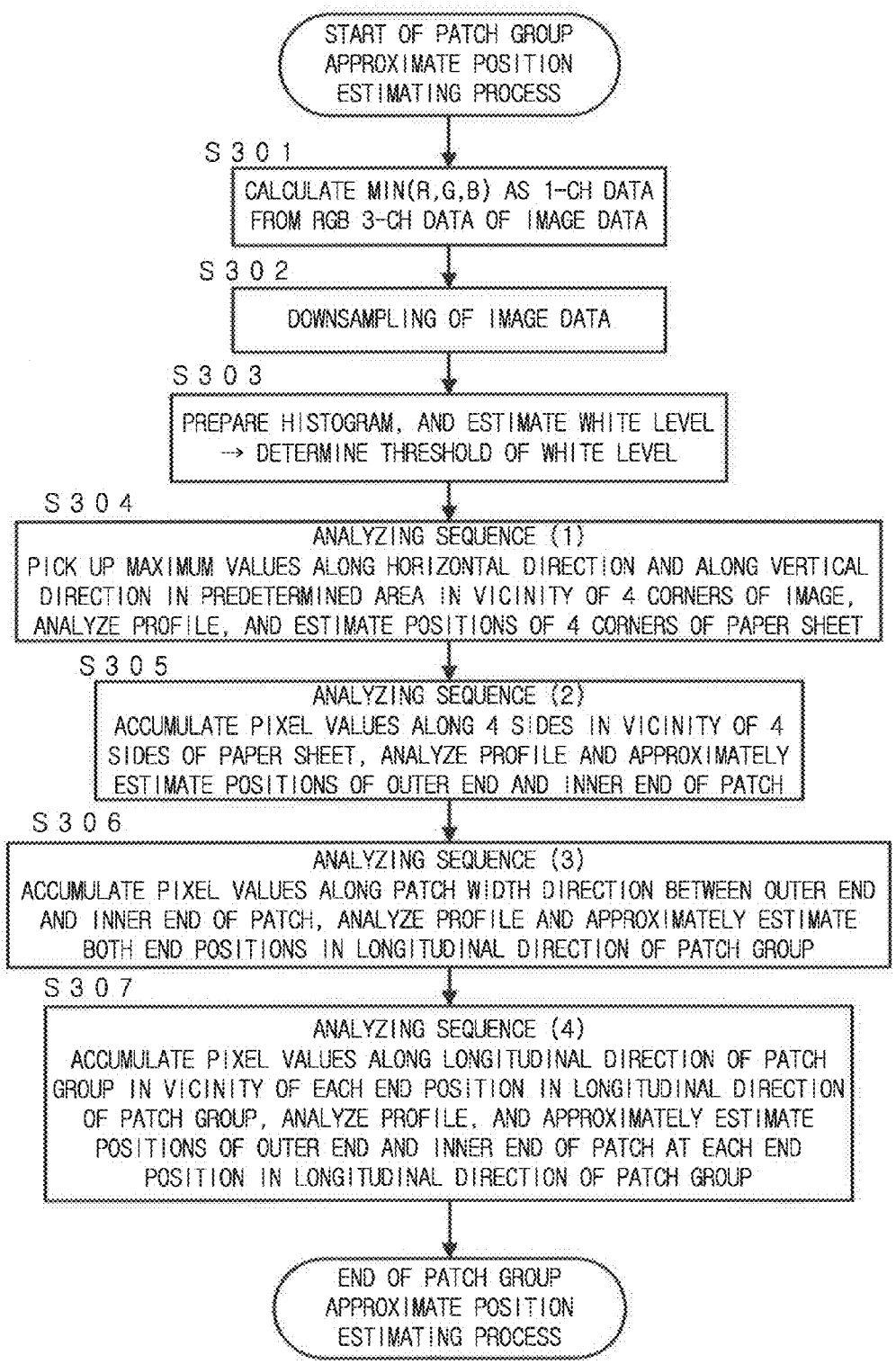
FIG. 10 is a flowchart illustrating the detail of the patch group approximate position estimating process (Step S201 in FIG. 8)

FIG. 10 shows the detail of the patch group approximate position estimating process (step S201 in FIG. 8). This process is performed by the CPU 31 of the printing system 10.

Figure 11:
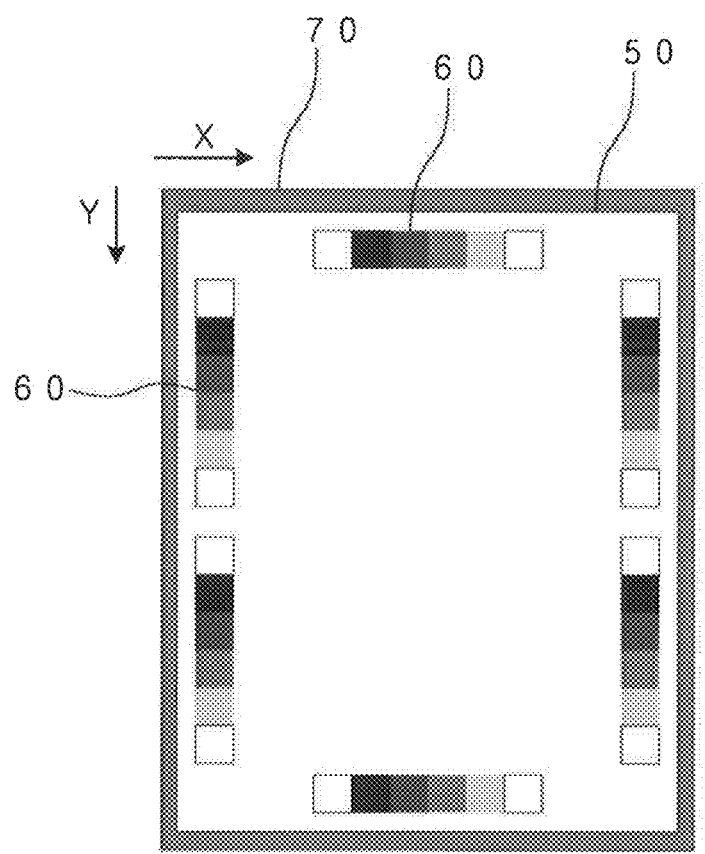
FIG. 11 is a view illustrating one example of the read image data obtained by reading an image with the reading unit, which is formed on the paper sheet on which the control strips are printed.

FIG. 11 shows one example of the read image data 70 obtained by reading the image with the reading unit 18, which is formed on the paper sheet on which the control strips 60 are printed. The read image data 70 is the image data obtained by reading the image on the paper sheet in the area which is slightly larger than the paper sheet 50 in both of the longitudinal direction and in the width direction. The peripheral edge of the paper sheet 50 can be recognized in the image data 70. The paper sheet 50 is white. In the outside of the paper sheet 50, the pixels having the dark color which is approximately black and which has the sufficiently high density in the read image data 70 are arranged.

In the patch group approximate position estimating process, the CPU 31 converts the read image data having three channels of red R, green G and blue B into one channel data in which the minimum value of the pixel values of R, G and B in each pixel is selected (Step S301). In this embodiment, as the density is high (deep), the pixel value becomes small.

Subsequently, the CPU 31 thins out (performs the downsampling of) the image data obtained by converting the read image data into one channel data, to reduce the data amount thereof (Step S302). If the processing speed is enough to process the one channel image data, the subsequent process may be performed without thinning out the image data.

The CPU 31 prepares a histogram that expresses the appearance frequency of each density in the above image data, estimates the white level, and determines the threshold of the white level (Step S303).

Figure 12:
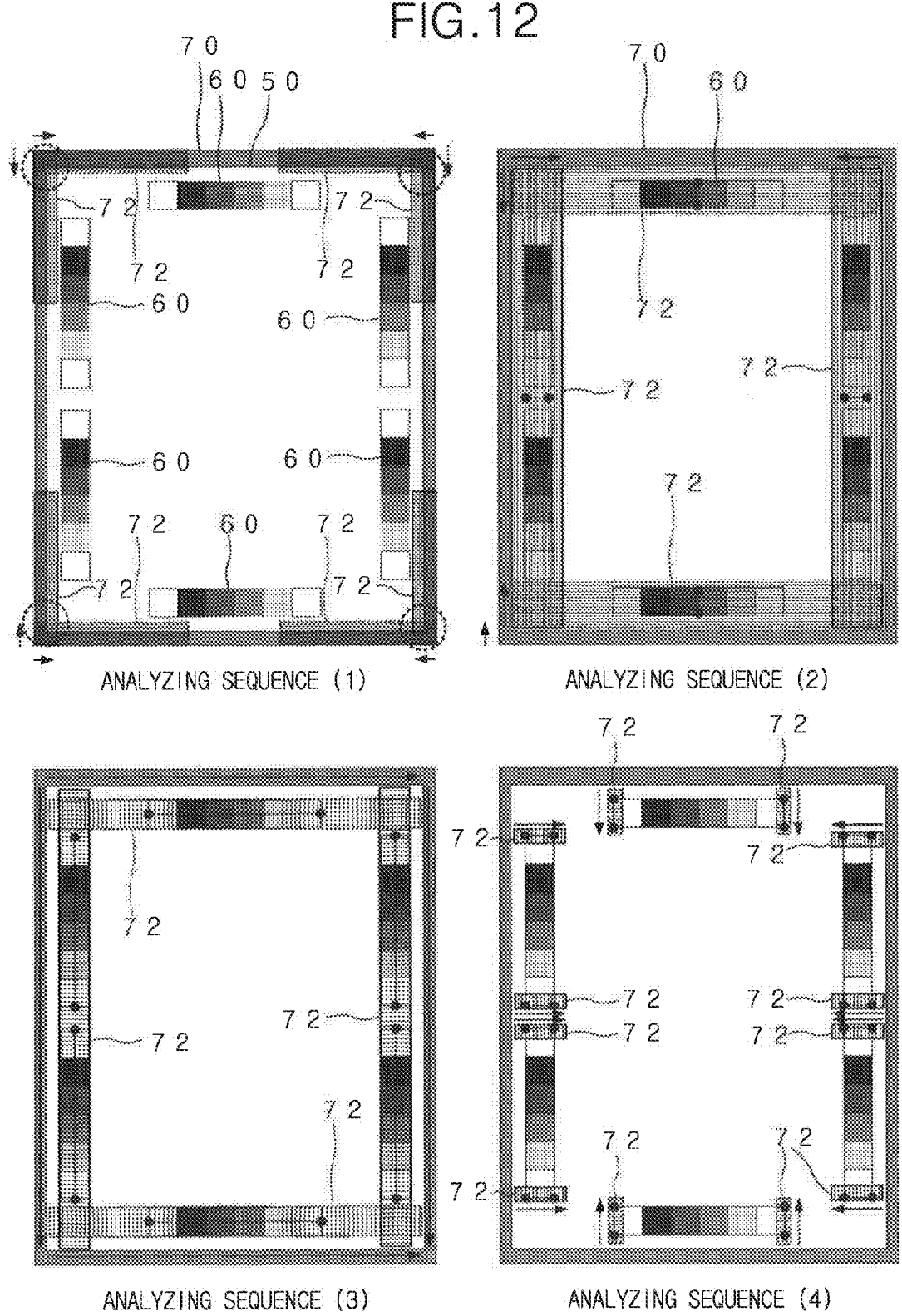
FIG. 12 is a view for explaining the summary of the analyzing sequences (1) to (4)

Subsequently, the CPU 31 performs four analyzing sequences (1) to (4) to estimate the approximate position of the patch group. FIG. 12 shows the summary of the analyzing sequences (1) to (4).

In the analyzing sequence (1), the CPU 31 detects the edge of the paper sheet 50 (Step S304). Specifically, the CPU 31 picks up the maximum values along the horizontal direction and along the vertical direction in the vicinity (in the area 72 to be analyzed) of each of the four corners of the image data obtained by converting the read image data into the one channel data. The CPU 31 analyzes the profile of the maximum values to estimate each approximate position of the four corners of the paper sheet 50. The outside of the paper sheet is dark (has the high density), and the paper sheet 50 is white. Accordingly, in accordance with the situation of the density change in each of the directions, the CPU 31 detects the edge of the paper sheet 50.

In the drawing, a rectangular area enclosed by the solid line or the dashed line is the area 72 to be analyzed. The direction of fine lines drawn inside the area 72 to be analyzed is referred as the line direction. For each of the above fine lines, the maximum value of the pixel values is picked up, and the accumulating calculation is performed at the analyzing sequence (2) or later.

Figure 13A:
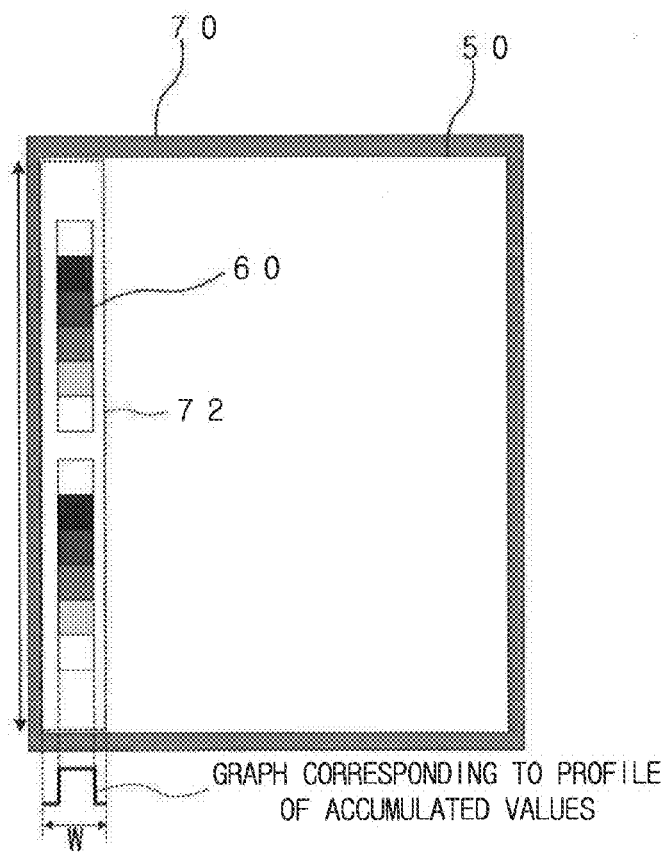
FIGS. 13A and 13B are views for explaining the detection of the approximate end positions in the width direction of the control strip according to the analyzing sequence (2)

In the analyzing sequence (2), the predetermined area extending in the inside direction of the paper sheet 50 from each side of the paper sheet 50 defined by the positions of the four corners of the paper sheet, which are calculated in the analyzing sequence (1) is analyzed as the area 72 to be analyzed. Then, the CPU 31 calculates the approximate end positions in the width direction of the control strip 60 arranged along the side of the paper sheet 50 (Step S305). Specifically, as illustrated in FIG. 13A, the area 72 to be analyzed is set by a rectangle having two sides, one of which is along one side of the paper sheet 50, and the other of which is perpendicular to the above one of two sides and which has the length of W extending from the above one of two sides in the inside direction of the paper sheet 50. The length W is set so as to include the control strip 60 which is the closest to the edge of the paper sheet, in the area 72 to be analyzed.

The CPU 31 performs the process of accumulating the pixel values on one line along the side of the paper sheet 50 in the area 72 to be analyzed, for each line in the area 72 to be analyzed sequentially to the inside of the paper sheet 50. The CPU 31 analyzes the profile of these accumulated values. Specifically, the CPU 31 detects the edge of the change of the accumulated values and estimates the approximate end positions in the width direction of the control strip 60 (each approximate position of the outer end near the side of the paper sheet 50 and the inner end, which is arranged inner than the outer end).

Figure 13B:
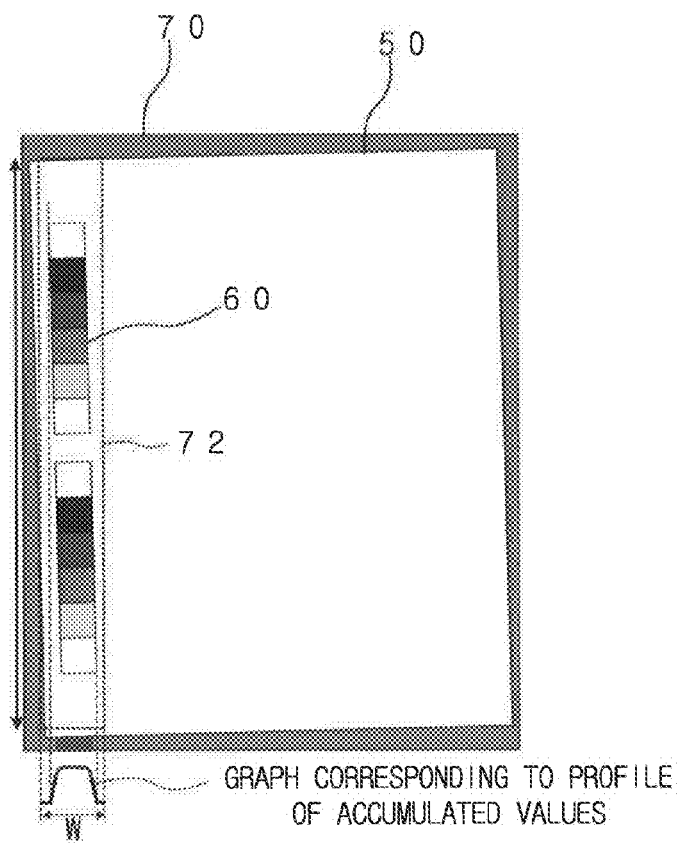

As illustrated in FIG. 13B, when the paper sheet is inclined, in the above method, because the edge of the graph corresponding to the profile of the accumulated values becomes gentle, the end positions in the width direction of the control strip 60 cannot be accurately calculated. Accordingly, in this step, the approximate end positions are estimated.

In the schematic view of the analyzing sequences (2) to (4) in FIG. 12, the approximate end positions which are estimated in each sequence are indicated by the circle marks.

In the analyzing sequence (3), the CPU 31 sets the area defined by the approximate positions in the width direction of the control strip 60, which are calculated in the analyzing sequence (2), to the area 72 to be analyzed. Then, the CPU 31 analyzes the set area 72 to specify the end positions in the longitudinal direction of the control strip 60 (Step S306). Each of the set areas 72 to be analyzed is a rectangle having the first side extending in the width direction of the area between the approximate end positions in the width direction of the control strip 60, which are calculated in the analyzing sequence (2), and the second side extending in the direction perpendicular to the first side in the area of the paper sheet 50 (See the analyzing sequence (3) in FIG. 12).

The CPU 31 repeatedly performs the process of accumulating pixel values on one line along the width direction of the control strip 60 in the area 72 to be analyzed, for each line in the area 72 to be analyzed, sequentially to the longitudinal direction of the control strip 60. The CPU 31 analyzes the profile of the accumulated values. Specifically, the CPU 31 detects the edge of the change of the accumulated values and estimates the approximate end positions in the longitudinal direction of the control strip 60.

The reason why the approximate end positions are estimated is the same as that of the case of detecting the end positions in the width direction by the analyzing sequence (2). However, because the length of each line on which the accumulated value is calculated is shorter than that in the case of the analyzing sequence (2), the approximate end positions in the longitudinal direction of the control strip 60 can be calculated more precisely than the approximate end positions in the width direction.

In the analyzing sequence (4), the CPU 31 sets the area in the vicinity of the approximate end positions in the longitudinal direction of the control strip 60, which are calculated in the analyzing sequence (3), to the area 72 to be analyzed, and analyzes the set area 72. Thereby, the CPU 31 specifies the end positions in the width direction of the control strip 60 more precisely than those in the analyzing sequence (2) (Step S307).

Specifically, the CPU 31 performs the process of accumulating the pixel values on one line along the longitudinal direction of the control strip 60 in the predetermined area in the vicinity of the approximate end positions in the longitudinal direction of the control strip 60, for each line in the area 72 to be analyzed, sequentially. The area 72 set in the analyzing sequence (4) has the slightly wider width including the width of the area between the approximate end positions in the width direction of the control strip 60, which are calculated in the analyzing sequence (2). The CPU 31 analyzes the profile of the calculated accumulated values. Specifically, the CPU 31 detects the edge of the change of the accumulated values and estimates the approximate end positions in the width direction of the control strip 60. These end positions are calculated more precisely than those in the analyzing sequence (2).

Figure 14:
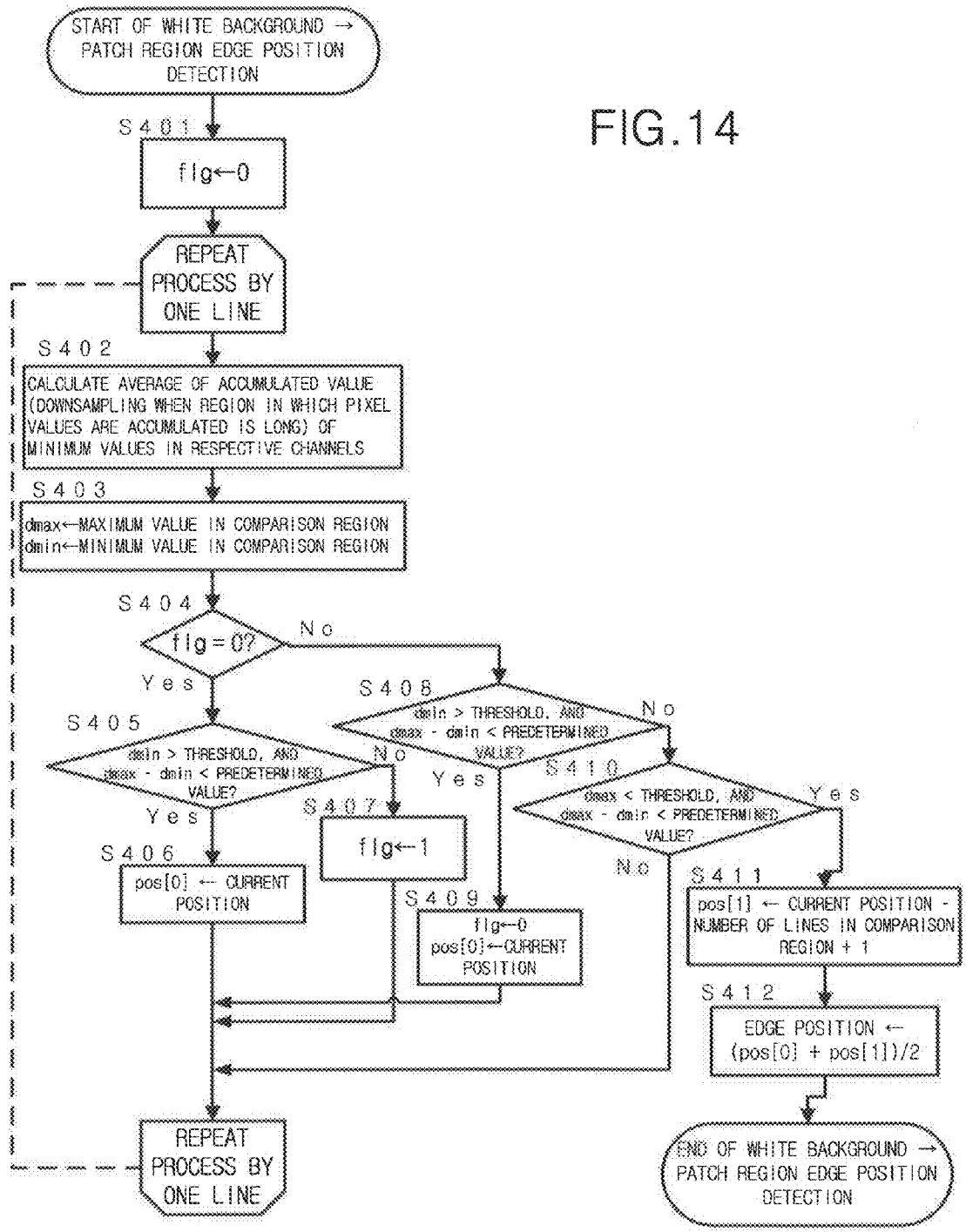
FIG. 14 is a flowchart illustrating the process of detecting a falling edge (edge from white to black), which is applied to the analyzing sequences (1) to (3)
Figure 15:
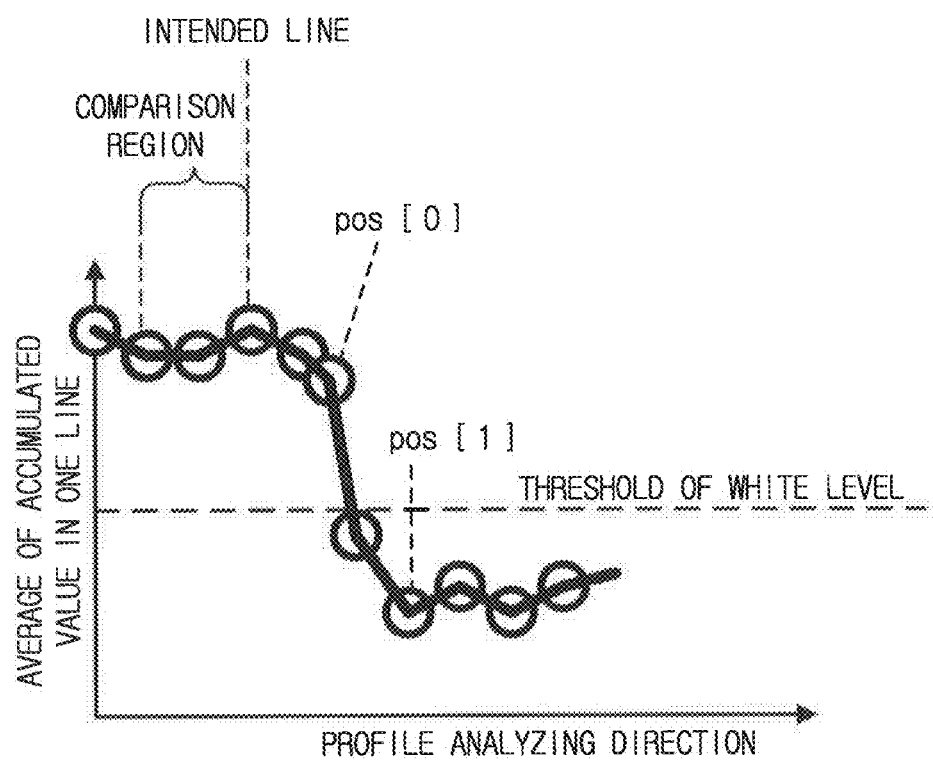
FIG. 15 is a view illustrating one example of a profile in the vicinity of the falling edge.

FIG. 14 is the flowchart illustrating the process of detecting a falling edge (edge from white to black), which is applied to the above-described analyzing sequences (1) to (3). FIG. 15 shows one example of the profile of the average of the accumulated value in the vicinity of the falling edge.

In the process of FIG. 14, a flag (flg) is set to the value "1" when the starting of the change indicating the sign of the failing edge is detected, and the flag is set to the value "0" when the above starting is not detected. The line position which is just before entering the falling edge region is set to the parameter pos[0]. The line position which is just after passing the falling edge region is set to the parameter pos[1].

The CPU 31 resets a value of the flag to an initial value "0" (Step S401). Next, the CPU 31 performs the following process for each line on which the pixel values are accumulated in the area 72 to be analyzed.

For the intended line, the CPU 31 calculates the average of the accumulated value of the minimum values (the value of which the density is the lowest in the channels) in the channels R, G and B of the respective pixels (Step S402). When the range in which the pixel values are accumulated is long (for example, in case of the analyzing sequence (2)), the CPU 31 may perform the downsampling.

Next, the maximum value and the minimum value of the above average in the comparison region including the intended line and the predetermined lines in the vicinity of the intended line are assigned to the variables dmax and dmin, respectively (Step S403). FIG. 15 shows a graph of the profile of the average of the accumulated value. For example, the front line in the profile analyzing direction is set to the intended line, and three lines which are the intended line and the previous two lines of the intended line are set to the comparison region. Then, the variables dmax and dmin are determined from the above comparison region.

When the minimum value dmin is larger than the threshold, it can be understood that the entire comparison region is within a region in which the density of each pixel is low (i.e., the region on the white side). When the maximum value dmax is smaller than the threshold, it can be understood that the entire comparison region is within a region in which the density of each pixel is high (i.e., the region on the black side). When the value (maximum value dmax−minimum value dmin) is smaller than a predetermined value, it can be understood that the edge region is not included in the comparison region.

While the flag is the value "0" (Step S404; Yes), the CPU 31 determines whether the following first condition is satisfied or not (Step S405). The first condition is that the minimum value dmin is larger than the threshold and the value (maximum value dmax−minimum value dmin) is smaller than the predetermined value. When the above first condition is satisfied, it can be determined that the entire comparison region including the intended line is within the region on the white side, and is not within the edge region. Therefore, the CPU 31 sets the current position (the position of the intended line) to the parameter pos[0] to update the current position (Step S406). Then, the process will be performed for the next line.

When the above first condition is not satisfied (Step S405; No), there is some possibility that the comparison region enters the falling edge region. Therefore, the CPU 31 sets the flag to the value "1" (Step S407). Then, the process will be performed for the next line.

When the flag is not the value "0" (Step S404; No), the CPU 31 checks again whether the first condition is satisfied in the same manner as in Step S405 (Step S408). When the first condition is satisfied (Step S408; Yes), the CPU 31 regards the determination for the previous line in which the comparison region enters the falling edge region, as an error determination caused by a noise or the like, and cancels the above determination. In other words, the CPU 31 returns the flag to the value "0", and sets the current position (the position of the intended line) to the parameter pos[0] (Step S409). Then, the process will be performed for the next line.

When the flag is not the value "0" (Step S404; No) and the first condition is not satisfied (Step S408; No), that is, when the state where the first condition is not satisfied continues for two lines, the CPU 31 checks whether the following second condition is satisfied (Step S410). The second condition is that the maximum value dmax is smaller than the threshold and the value (maximum value dmax−minimum value dmin) is smaller than the predetermined value. When the second condition is satisfied, it can be determined that the entire comparison region including the intended line is within the region on the black side, and is not within the edge region. Meanwhile, when the second condition is not satisfied, it is estimated that the graph falls within the comparison region.

Therefore, when the above second condition is not satisfied (Step S410; No), the process will be directly performed for the next line.

When the second condition is satisfied (Step S410; Yes), it can be determined that the entire comparison region including the intended line enters the region on the black side (has passed the falling edge region in which the graph falls from the white). Therefore, the CPU 31 sets the line position that is within the current comparison region and that is the closest to the falling edge, to the parameter pos[1] (Step S411). Then, the CPU 31 specifies the intermediate position between the line position that is indicated by the parameter pos[0] and that is just before entering the falling edge region and the line position that is indicated by the parameter pos[1] and that is just after passing the falling edge region, as the position of the falling edge (Step S412). The process is ended.

In the profile analysis shown in FIG. 15, the CPU 31 determines the final parameters pos[0] and pos[1] as the line positions illustrated in the drawing, and detects the intermediate line position between the above line positions, as the position of the falling edge.

Figure 16:
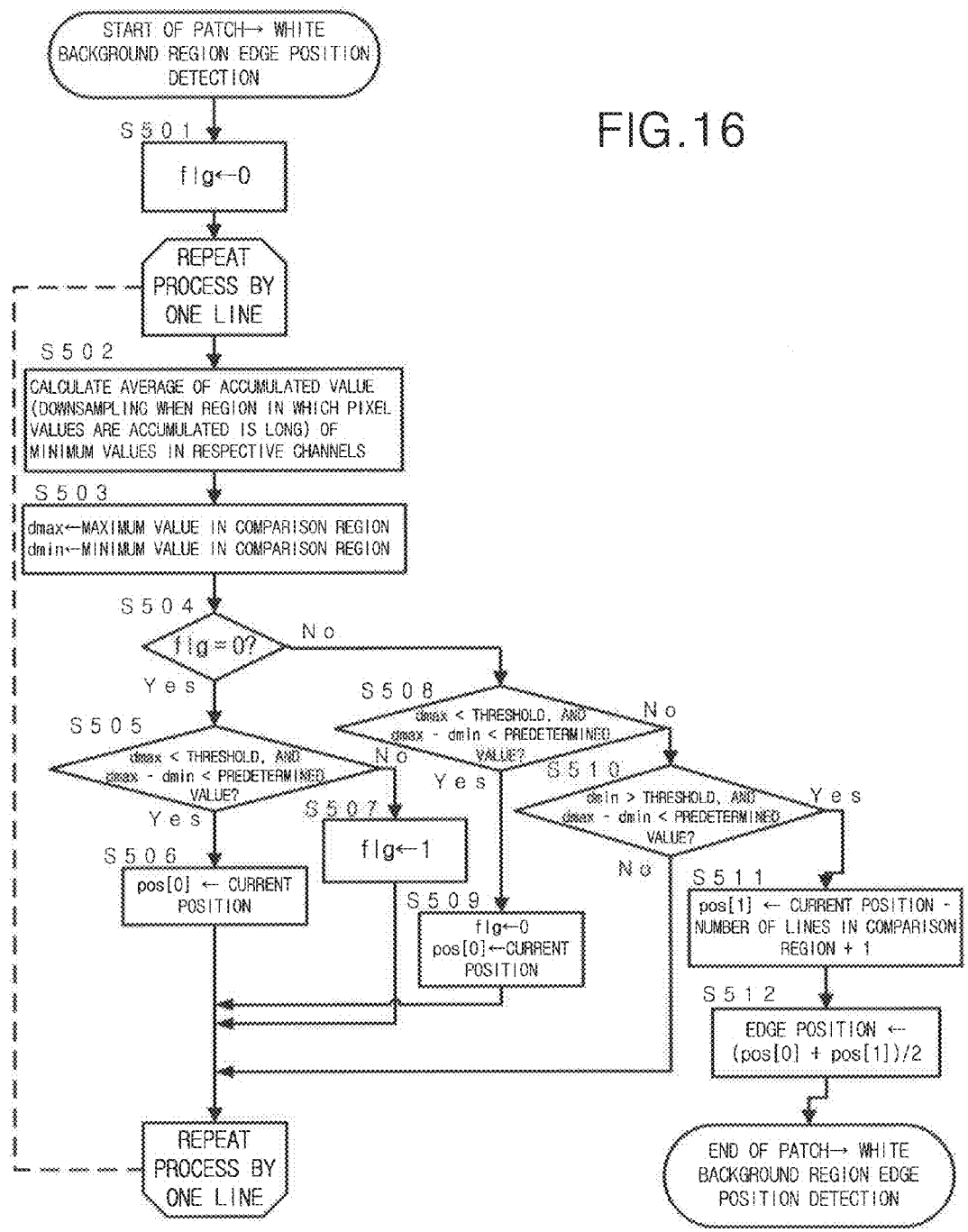
FIG. 16 is a flowchart illustrating the process of detecting a rising edge (edge from black to white), which is applied to the analyzing sequences (1) to (3)
Figure 17:
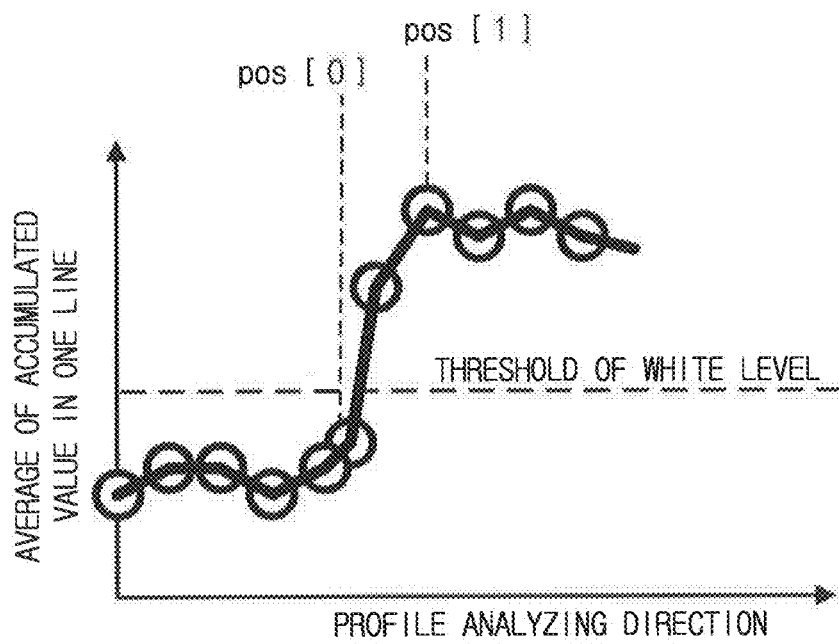
FIG. 17 is a view illustrating one example of a profile in the vicinity of the rising edge.

FIG. 16 is a flowchart illustrating the process of detecting a rising edge (edge from black to white), which is applied to the above-described analyzing sequences (1) to (3). FIG. 17 shows one example of the profile of the average of the accumulated value in the vicinity of the rising edge.

In the process of FIG. 16, a flag (flg) is set to the value "1" when the starting of the change indicating the sign of the rising edge is detected, and the flag is set to the value "0" when the above starting is not detected. The line position which is just before entering the rising edge region is set to the parameter pos[0]. The line position which is just after passing the rising edge region is set to the parameter pos[1].

The CPU 31 resets a value of the flag to an initial value "0" (Step S501). Next, the CPU 31 performs the following process for each line on which the pixel values are accumulated in the area 72 to be analyzed.

For the intended line, the CPU 31 calculates the average of the accumulated value of the minimum values (the value of which the density is the lowest in the channels) in the channels R, G and B of the respective pixels (Step S502). When the range in which the pixel values are accumulated is long (for example, in case of the analyzing sequence (2)), the CPU 31 may perform the downsampling.

Next, the maximum value and the minimum value of the above average in the comparison region including the intended line and the predetermined lines in the vicinity of the intended line are assigned to the variables dmax and dmin, respectively (Step S503).

While the flag is the value "0" (Step S504; Yes), the CPU 31 determines whether the following third condition is satisfied or not (Step S505). The third condition is that the maximum value dmax is smaller than the threshold, and the value (maximum value dmax−minimum value dmin) is smaller than the predetermined value. When the above third condition is satisfied, it can be determined that the entire comparison region including the intended line is within the region on the black side, and is not within the edge region. Therefore, the CPU 31 sets the current position (the position of the intended line) to the parameter pos[0] to update the current position (Step S506). Then, the process will be performed for the next line.

When the above third condition is not satisfied (Step S505; No), there is some possibility that the comparison region enters the rising edge region. Therefore, the CPU 31 sets the flag to the value "1" (Step S507). Then, the process will be performed for the next line.

When the flag is not the value "0" (Step S504; No), the CPU 31 checks again whether the third condition is satisfied in the same manner as in Step S505 (Step S508). When the third condition is satisfied (Step S508; Yes), the CPU 31 regards the determination for the previous line in which the comparison region enters the rising edge region, as an error determination caused by a noise of the like, and cancels the above determination. In other words, the CPU 31 returns the flag to the value "0", and sets the current position (the position of the intended line) to the parameter pos[0] to update the current position (Step S509). Then, the process will be performed for the next line.

When the flag is not the value "0" (Step S504; No and the third condition is not satisfied (Step S508; No), that is, when the state where the third condition is not satisfied continues for two lines, the CPU 31 checks whether the following fourth condition is satisfied (Step S510). The fourth condition is that the minimum value dmin is larger than the threshold, and the value (maximum value dmax−minimum value dmin) is smaller than the predetermined value. When the fourth condition is satisfied, it can be determined that the entire comparison region including the intended line is within the region on the white side, and is not within the edge region. Meanwhile, when the fourth condition is not satisfied, it is estimated that the graph rises within the comparison region.

Therefore, when the above fourth condition is not satisfied (Step S510; No), the process will be directly performed for the next line.

When the fourth condition is satisfied (Step S510; Yes), it can be determined that the entire comparison region including the intended line enters the region on the white side (has passed the rising edge region in which the graph rises from the black). Therefore, the CPU 31 sets the line position that is within the current comparison region and that is the closest to the rising edge, to the parameter pos[1] (Step S511). Then, the CPU 31 specifies the intermediate position between the line position that is indicated by the parameter pos[0] and that is just before entering the rising edge region and the line position that is indicated by the parameter pos and that is just after passing the rising edge region, as the position of the rising edge (Step S512). The process is ended.

In the profile analysis shown in FIG. 17, the CPU 31 determines the final parameters pos[0] and pos[1] as the line positions illustrated in the drawing, and detects the intermediate line position between the above line positions, as the position of the rising edge.

Next, the process of detecting the fine line will be described.

Figure 18:
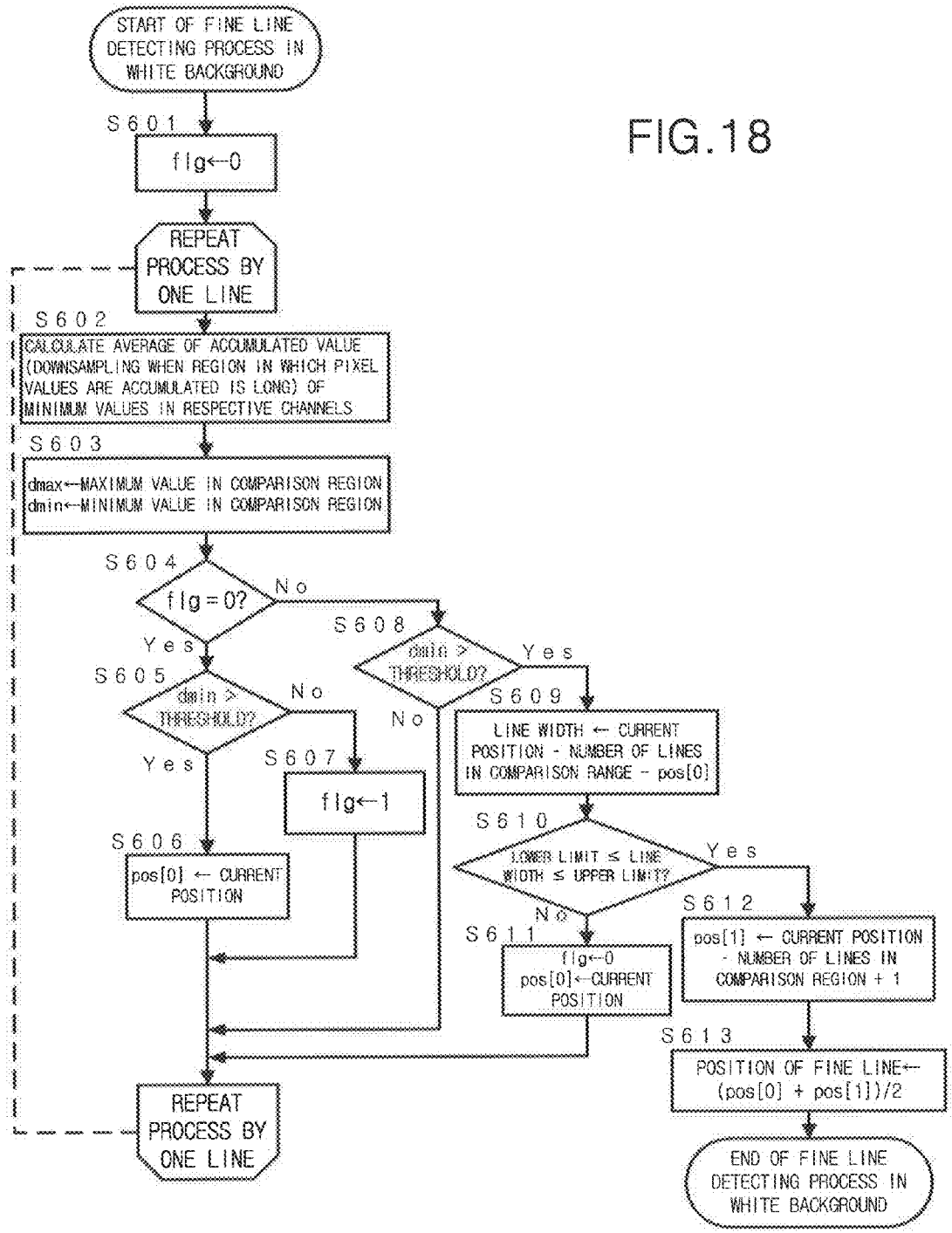
FIG. 18 is a flowchart illustrating the fine line detecting process in a white background.
Figure 19:
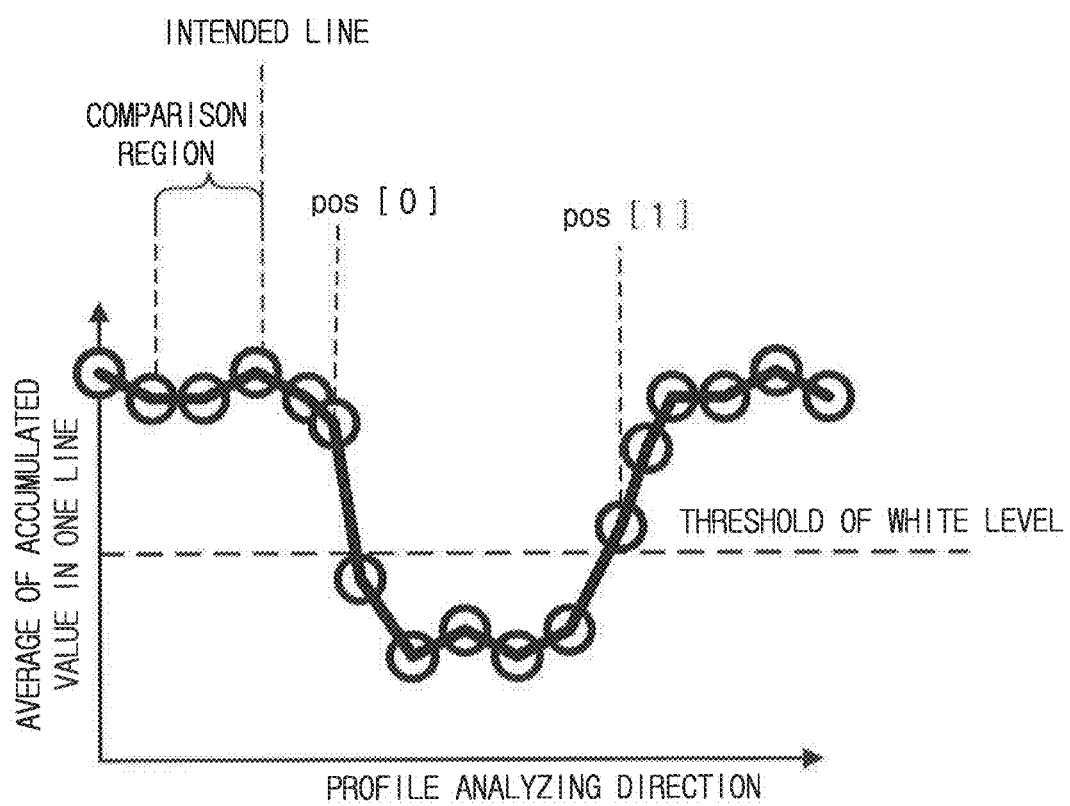
FIG. 19 is a view illustrating one example of a profile in the vicinity of the fine line.

FIG. 18 shows a flowchart of the fine line detecting process in the white background. FIG. 19 shows one example of the profile in the vicinity of the fine line.

In the process of FIG. 18, a flag (flg) is set to the value "1" when the comparison region enters a fine line region, and the flag is maintained to be the value "0" until the comparison region enters the fine line region. The line position which is just before entering the fine line region is set to the parameter pos[0]. The line position which is just after passing the fine line region is set to the parameter pos[1].

The CPU 31 resets a value of the flag to the initial value "0" (Step S601). Next, the CPU 31 performs the following process for each line on which the pixel values are accumulated in the area 72 to be analyzed.

Next, for the intended line, the CPU 31 calculates the average of the accumulated value of the minimum values (the value of which the density is the lowest in the channels) in the channels R, C and B of the respective pixels (Step S602). When the range in which the pixel values are accumulated is long, the CPU 31 may perform the downsampling.

Next, the maximum value and the minimum value of the above average in the comparison region including the intended line and the predetermined lines in the vicinity of the intended line are assigned to the variables dmax and dmin, respectively (Step S603).

While the flag is the value "0" (Step S604; Yes), the CPU 31 determines whether the following fifth condition is satisfied (Step S605). The fifth condition is that the minimum value dmin is larger than the threshold. When the fifth condition is satisfied (Step S605; Yes), it can be determined that the entire comparison region including the intended line is within the region on the white side. Therefore, the CPU 31 sets the current position (the position of the intended line) to the parameter pos[0] to update the current position (Step S606). Then, the process will be performed for the next line.

When the above fifth condition is not satisfied (Step S605; No), there is some possibility that the comparison region enters the fine line region. Therefore, the CPU 31 sets the flag to the value "1" (Step S607). Then, the process will be performed for the next line.

When the flag is not the value "0" (Step S604; No), the CPU 31 checks again whether the fifth condition is satisfied in the same manner as in Step S605 (Step S608). When the fifth condition is not satisfied (Step S608; No), the CPU 31 determines that the comparison region is continuously within the fine line region. Therefore, the process will be directly performed for the next line.

When the fifth condition is satisfied again (Step S608; Yes), the CPU 31 determines that the comparison region has passed the fine line region, and calculates the width of the fine line as the value (current position−the number of lines in the comparison region−pos[0]) (Step S609).

The CPU 31 checks whether the calculated width of the fine line is within an acceptable range of the assumed width of the fine line (Step S610). When the calculated width is not within the acceptable range (Step S610; No), the CPU 31 determines that the detected line is a noise, and cancels the detected line. In other words, the CPU 31 returns the flag to the value "0", and sets the current position (the position of the intended line) to the parameter pos[0] (Step S611). Then, the process will be performed for the next line.

When the calculated width is within the acceptable range (Step S610; Yes) the CPU 31 sets the line position which is within the current comparison region and which is the closest to the fine line region in the analyzing direction, to the parameter pos[1] (Step S612). Then, the CPU 31 specifies the intermediate position between the starting position of the fine line (the position at which the white region is changed to the fine line region), which is indicated by the parameter pos[0], and the ending position of the fine line (the position at which the fine line region is changed to the white region), which is indicated by the parameter pos[1], as the position of the fine line (Step S613). The process is ended.

In the example of FIG. 19, the CPU 31 determines the final parameters pos[0] and pos[1] as the line positions illustrated in the drawing, and detects the intermediate line position between the above line positions, as the position of the fine line.

Next, the process in the analyzing sequence (3) will be described in more detail.

Figure 20:
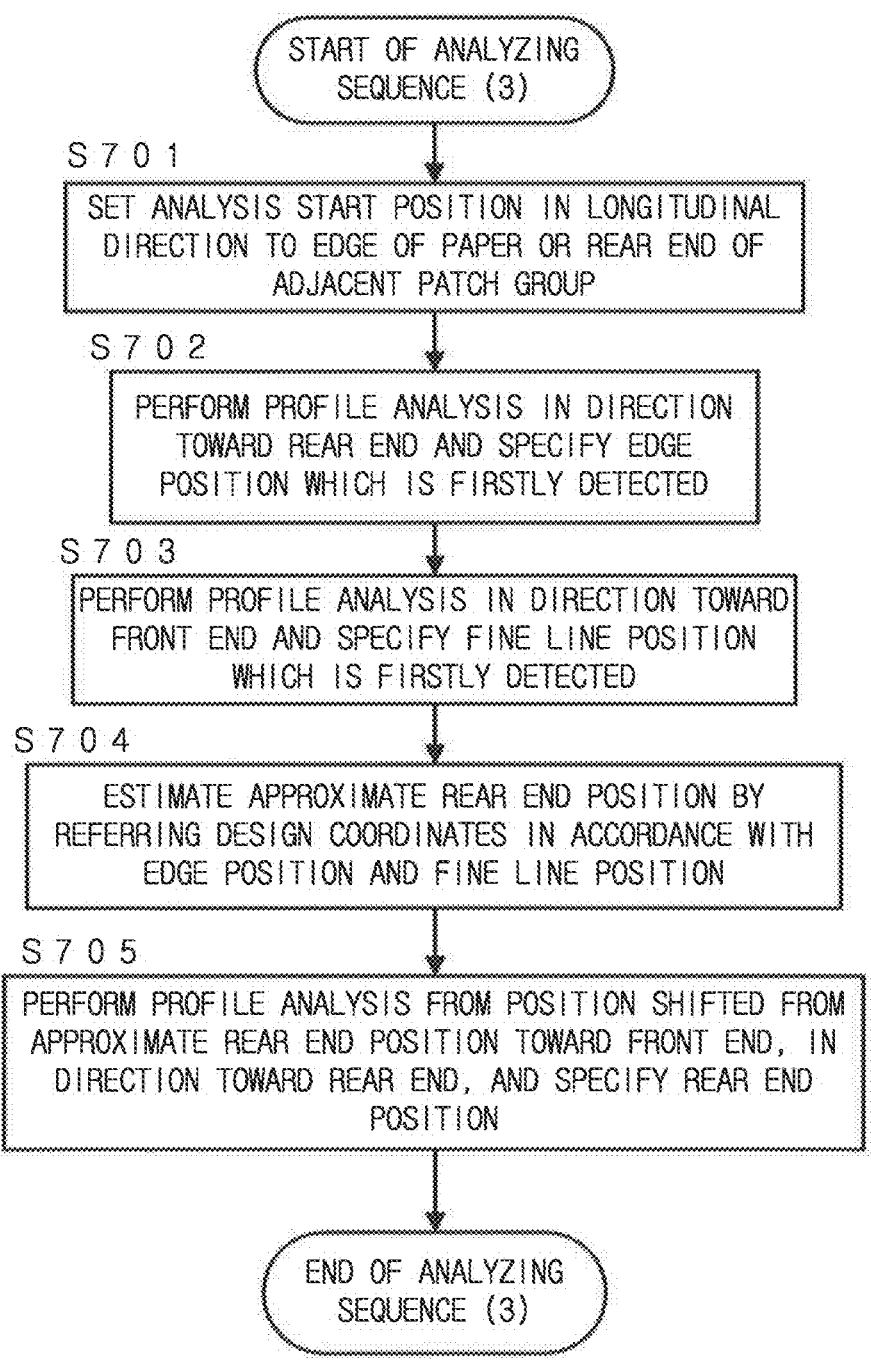
FIG. 20 is a flowchart illustrating the process in the analyzing sequence (3)
Figure 21:
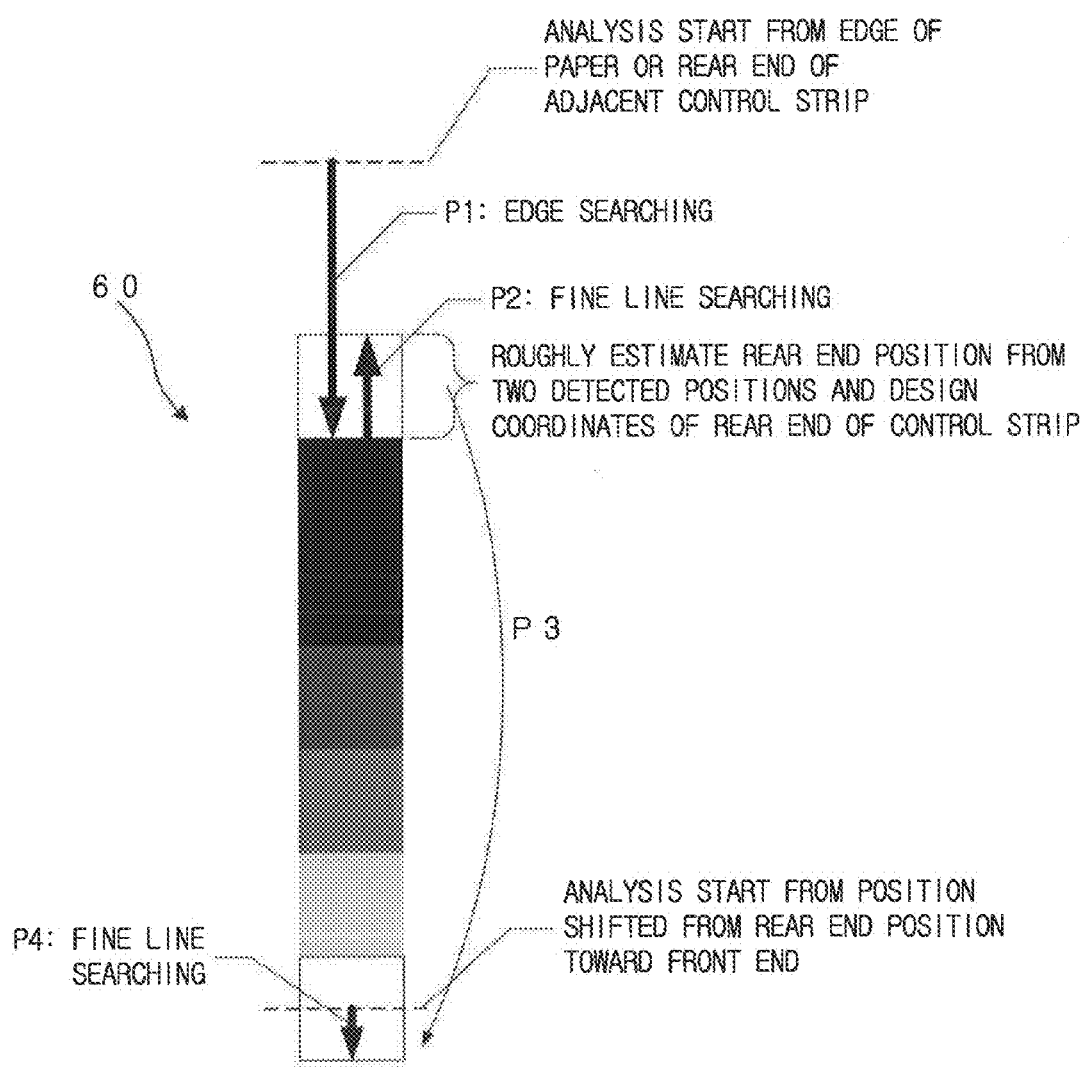
FIG. 21 is a view illustrating the summary of a specific analyzing example according to the analyzing sequence (3)

FIG. 20 shows the flowchart of the process in the analyzing sequence (3). FIG. 21 shows the summary of a specific analyzing example according to the analyzing sequence (3). First, the CPU 31 sets one edge of the paper sheet 50 or the rear end of the adjacent control strip 60 to the analysis start position in the analyzing of the end position in the longitudinal direction of the control strip 60 (Step S701). In the ends to be detected in the longitudinal direction of the control strip 60, an end which is positioned on the side near the analysis start position is the front end, and the other end is the rear end.

From the analysis start position, the CPU 31 performs the profile analysis in the direction toward the rear end and specifies an edge position which is firstly detected (Step S702, P1 in FIG. 21).

Next, by setting the detected edge position to a base point, the CPU 31 performs the profile analysis in the direction from the base point toward the analysis start position and specifies the fine line position which is firstly detected (Step S703, P2 in FIG. 21).

Next, in accordance with the edge position and the fine line position that are detected in the previous steps and the design information of the control strip 60, the CPU 31 estimates the approximate rear end position of the control strip 60 (Step S704, P3 in FIG. 21). In this embodiment, the difference between the edge position and the fine line position is the length Lp of one patch. From this length Lp and the number C of the patches constituting the control strip 60, the CPU 31 sets the value (Lp×C) to the length in the longitudinal direction of the control strip 60. Then, the CPU 31 estimates the approximate rear end position of the control strip 60.

From the position which is shifted from the estimated rear end position toward the front end by the predetermined short length (for example, the approximately half of the length of one patch), the CPU 31 performs the analysis in the direction toward the rear end. Thereby, the CPU 31 specifies the fine line position which is firstly detected, as the rear end of the control strip 60 (Step S705, P4 in FIG. 21).

As described above, by performing the process in which the CPU 31 detects the first edge by the analysis from the analysis start position in the rear end direction and detects the first fine line by the analysis from the detected edge in the front end direction, even though another confusable fine line, such as the crop mark for determining the cutting position, exists between the analysis start position and the control strip 60, the fine line which is positioned at the end (the end on the front side) of the control strip 60 can be precisely detected.

Further, by estimating the approximate rear end position of the control strip 60 in Step S704 and performing the fine line detecting process only in the vicinity region of the approximate rear end position in Step S705, the CPU 31 specifies the rear end position of the control strip 60. Thereby, the fine line which is positioned at the rear end can be specified with the small throughput for detecting the fine line.

Next, the reference point detail position estimating process (Step S202 in FIG. 8) will be described in detail.

In the reference point detail position estimating process, the CPU 31 detects the detail position of the reference point from the approximate position of each of the four corners of the control strip 60 (patch group), which is calculated by the patch group approximate position estimating process (Step S201 in FIG. 8).

Figure 22:
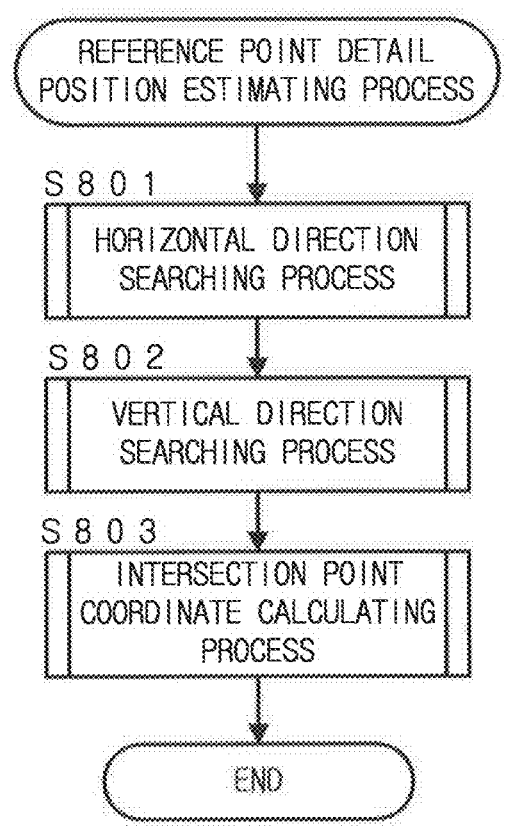
FIG. 22 is a flowchart illustrating the whole reference point detail position estimating process.

FIG. 22 shows the flowchart of the whole reference point detail position estimating process. By calculating the approximate position of each of the four corners of the control strip 60, an area in which the reference point is searched in order to detect the detail position of the reference point can be determined. In the present process, the reference point is searched in the above area. The above area is set to an area including the two straight lines defining the reference point. In the examples in FIGS. 4 to 6D, an area in which the fine line "a" and the perpendicular fine line "b" can be detected is set as the above area.

First, the CPU 31 performs the horizontal direction searching process of detecting the line segment in the vertical direction out of the two lines defining the reference point (Step S801). Subsequently, the CPU 31 performs the vertical direction searching process of detecting the line segment in the horizontal direction (Step S802). Then, the CPU 31 performs the intersection point coordinate calculating process of calculating the intersection point between these two detected lines as the reference point (Step S803). Then, the process is ended.

Figure 23:
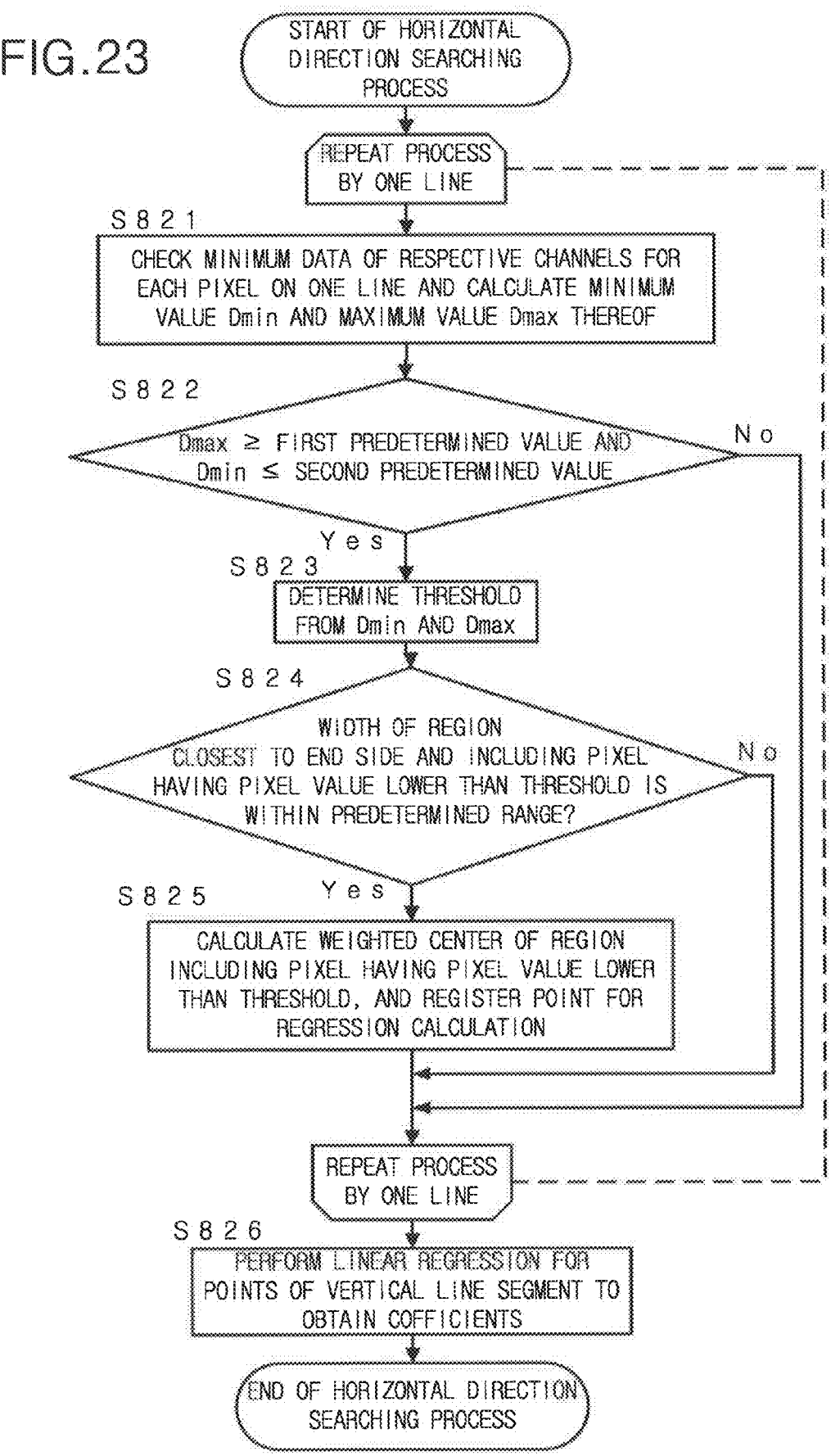
FIG. 23 is a flowchart illustrating the detail of the horizontal direction searching process (Step S801 in FIG. 22)
Figure 24:
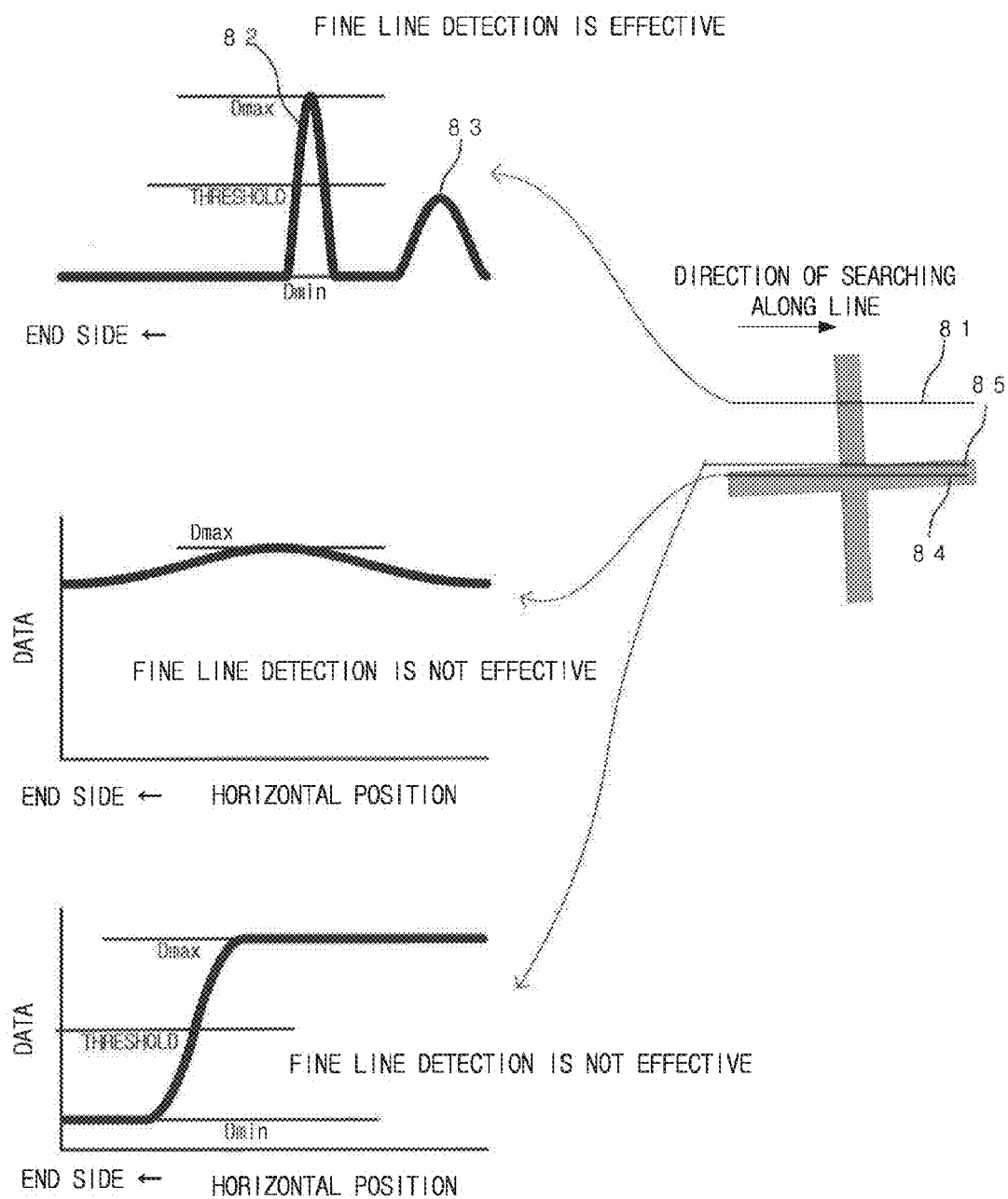
FIG. 24 is a view illustrating the summary of a specific example of the line detection.

FIG. 23 shows the flowchart illustrating the detail of the horizontal direction searching process (Step S801 in FIG. 22), and FIG. 24 shows the summary of a specific example of the line detection according to the horizontal direction searching process. In the horizontal direction searching process, the CPU 31 searches the line segment extending in the vertical direction on the horizontal line by one line along the horizontal direction of the image data within the above set area. The CPU 31 detects the point at which the horizontal line intersects with the line segment of the fine line which extends in the vertical direction (or which may incline to an extend). Then, the CPU 31 repeats the detection of the above point by sequentially moving the horizontal line in the vertical direction within the set area. Thereby, in accordance with the arrangement of the detected points, the CPU 31 detects the line segment in the vertical direction by the regression calculation.

Specifically, by considering the minimum value of the pixel values of the respective channels constituting one pixel on one line in the horizontal direction as the pixel value of the one pixel, the CPU 31 calculates the minimum value Dmin and the maximum value Dmax of the densities on the above one line in the horizontal direction (Step S821).

Next, the CPU 31 determines whether the condition that the value Dmax is not less than the first predetermined value and the value Dmin is not more than the second predetermined value is satisfied (Step S822). The first predetermined value is a value indicating that the pixel value is sufficiently shifted to the black side (the pixel has high density) as compared with the middle value in the range of the possible pixel values. The second predetermined value is a value indicating that the pixel value is sufficiently shifted to the white side (the pixel has low density) as compared with the above middle value.

When the above condition is not satisfied (Step S822; No), the CPU 31 performs the horizontal direction searching process for the next horizontal line.

When the above condition is satisfied (Step S822; Yes), the middle value between the value Dmin and the value Dmax is set to the threshold (Step S823). Then, the CPU 31 determines whether the width of the region corresponding to the line, which is closest to the end side among the region(s) corresponding to the line, in which the pixel having the pixel value lower than the above threshold exists (among the region(s) in which the pixel having higher density than the threshold exists) is within the predetermined range (Step S824). This predetermined range is an acceptable range of the assumed width of the fine line.

When the width of the region which is closest to the end side is not within the predetermined range (Step S824; No), the CPU 31 performs the horizontal direction searching process for the next horizontal line.

When the width of the region which is closest to the end side is within the predetermined range (Step S824; Yes), the CPU 31 calculates the weighted center of this region and registers the weighted center as the point for the regression calculation (Step S825). Then, the CPU 31 performs the horizontal direction searching process for the next horizontal line.

The CPU 31 performs the above process for all of the horizontal lines in the set area and calculates a straight line (coefficients of the expression) in the vertical direction from a plurality of the registered points by using the linear regression (Step S826). Then, the process is ended.

For example, in the example of the FIG. 24, the CPU 31 determines whether the width of the region 82 which is closest to the end side on the first horizontal line 81 is within the predetermined range, and ignores the next region 83. Because the width of the region 82 is within the predetermined range, the CPU 31 calculates the weighted center of the region 82 and registers the weighted center as one point for the regression calculation.

In case of the second horizontal line 84, because the value Dmin is not equal to or smaller than the second predetermined value, it is determined to be "No" in Step S822. In case of the third horizontal line 85, because the width of the region exceeds the predetermined range, it is determined to be "No" in Step S824.

Figure 25:
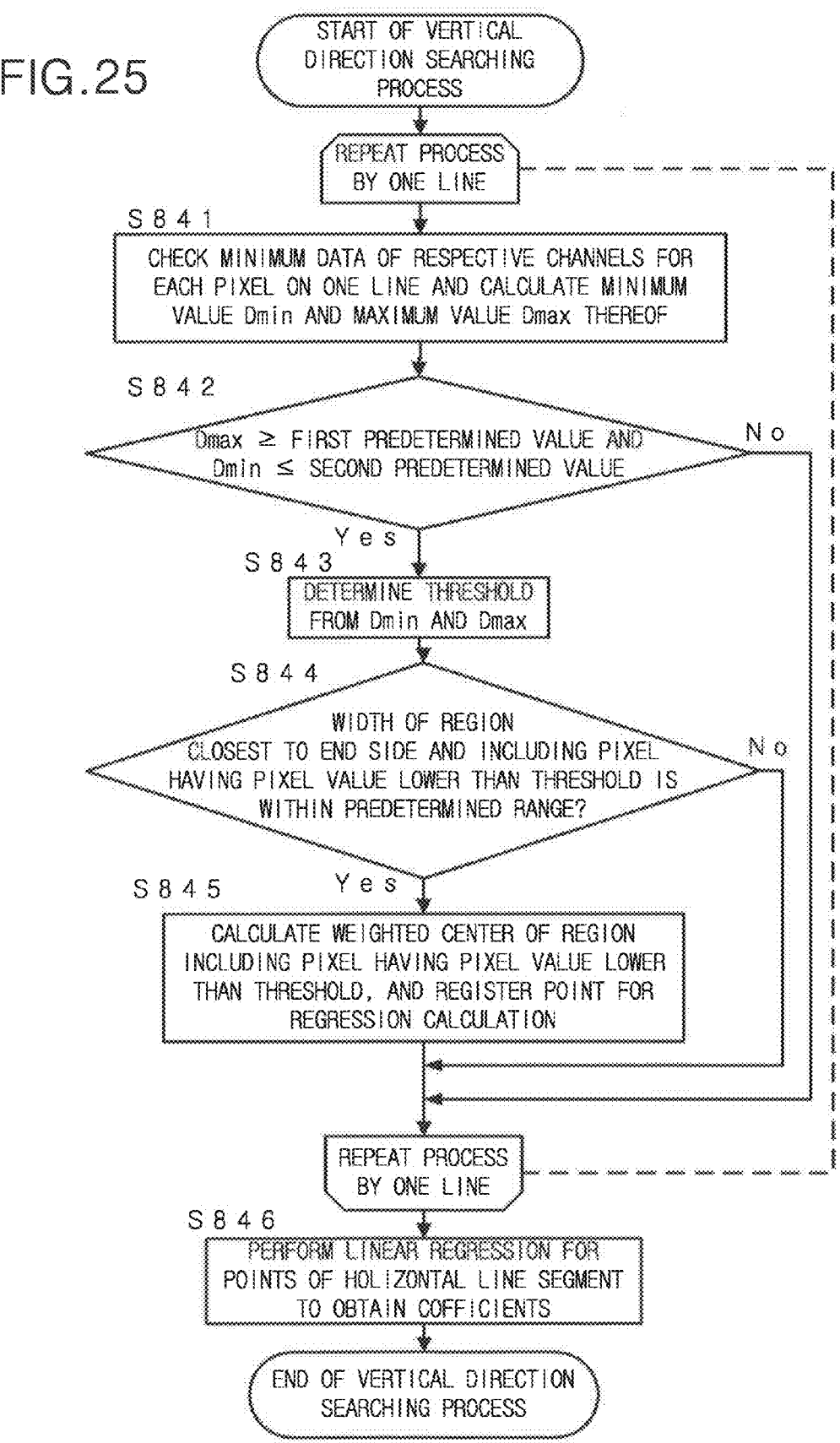
FIG. 25 is a flowchart illustrating the detail of the vertical direction searching process (Step S802 in FIG. 22)

FIG. 25 shows the flowchart illustrating the detail of the vertical direction searching process (Step S802 in FIG. 22). In the vertical direction searching process, the CPU 31 searches the line segment extending in the horizontal direction on the vertical line by one line along the vertical direction of the image data within the above set area. The CPU 31 detects the point at which the vertical line intersects with the line segment of the fine line which extends in the horizontal direction (or which may incline to an extend). Then, the CPU 31 repeats the detection of the above point by sequentially moving the vertical line in the horizontal direction within the set area. Thereby, in accordance with the arrangement of the detected points, the CPU 31 detects the line segment in the horizontal direction by the regression calculation.

Specifically, by considering the minimum value of the pixel values of the respective channels constituting one pixel on one line in the vertical direction as the pixel value of the one pixel, the CPU 31 calculates the minimum value Dmin and the maximum value Dmax of the densities on the above one line in the vertical direction (Step S841).

Next, the CPU 31 determines whether the condition that the value Dmax is not less than the first predetermined value and the value Dmin is not more than the second predetermined value is satisfied (Step S842). The first predetermined value is a value indicating that the pixel value is sufficiently shifted to the black side (the pixel has high density) as compared with the middle value in the range of the possible pixel values. The second predetermined value is a value indicating that the pixel value is sufficiently shifted to the white side (the pixel has low density) as compared with the above middle value.

When the above condition is not satisfied (Step S842; No), the CPU 31 performs the vertical direction searching process for the next vertical line.

When the above condition is satisfied (Step S842; Yes), the middle value between the value Dmin and the value Dmax is set to the threshold (Step S843). Then, the CPU 31 determines whether the width of the region corresponding to the line, which is closest to the end side among the region(s) corresponding to the line, in which the pixel having the pixel value lower than the above threshold exists (among the region(s) in which the pixel having higher density than the threshold exists) is within the predetermined range (Step S844). The predetermined range is an acceptable range of the assumed width of the fine line.

When the width of the region which is closest to the end side is not within the predetermined range (Step S844; No), the CPU 31 performs the vertical direction searching process for the next vertical line.

When the width of the region which is closest to the end side is within the predetermined range (Step S844; Yes), the CPU 31 calculates the weighted center of this region and registers the weighted center as the point for the regression calculation (Step S845). Then, the CPU 31 performs the vertical direction searching process for the next vertical line.

The CPU 31 performs the above process for all of the vertical lines in the set area and calculates a straight line (coefficients of the expression) in the horizontal direction from a plurality of the registered points by using the linear regression (Step S846). Then, the process is ended.

In order to precisely obtain the coefficients of the straight lines in the processes of Steps S801 and S802, it is required that the number of the points used in the linear regression is more than a predetermined value. Therefore, it is necessary that each of the two straight lines (the fine line "a" and the perpendicular fine line "b") for calculating the reference point has the required number of effective pixels. The number of effective pixels preferably corresponds to the length which is not less than one third of the length of each side of the end patch 61. As long as each straight line has the required number of the pixels, the fine line "a" and the perpendicular fine line "b" may be a solid line or a dashed line, and the distributed state of the pixels may be set arbitrarily.

Figure 26:
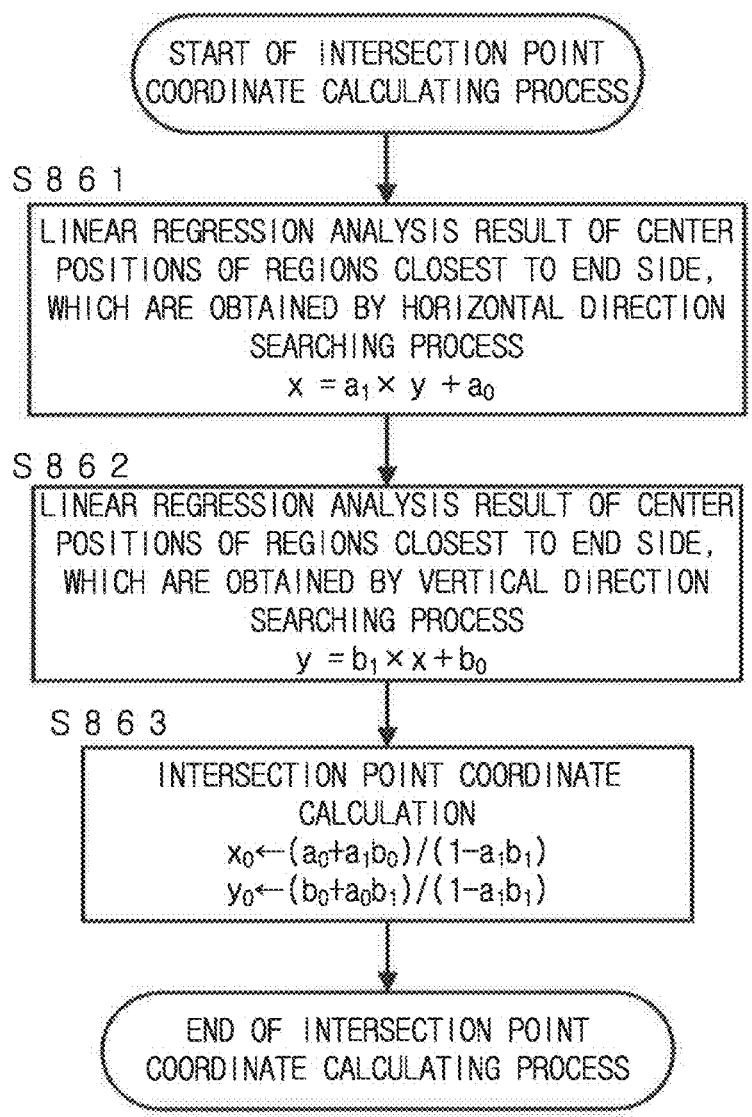
FIG. 26 is a flowchart illustrating the detail of the intersection point coordinate calculating process (Step S803 in FIG. 22)

FIG. 26 shows the detail of the intersection point coordinate calculating process (Step S803 in FIG. 22). From the expression (Step S861) of the straight line in the vertical direction, which is calculated by the horizontal direction searching process (Step S801 in FIG. 22) and the expression (Step S862) of the straight line in the horizontal direction, which is calculated by the vertical direction searching process (Step S802 in FIG. 22), the CPU 31 calculates the intersection point between the above two straight lines as the position of the reference point (Step S863). Then, the process is ended.

Figure 27:
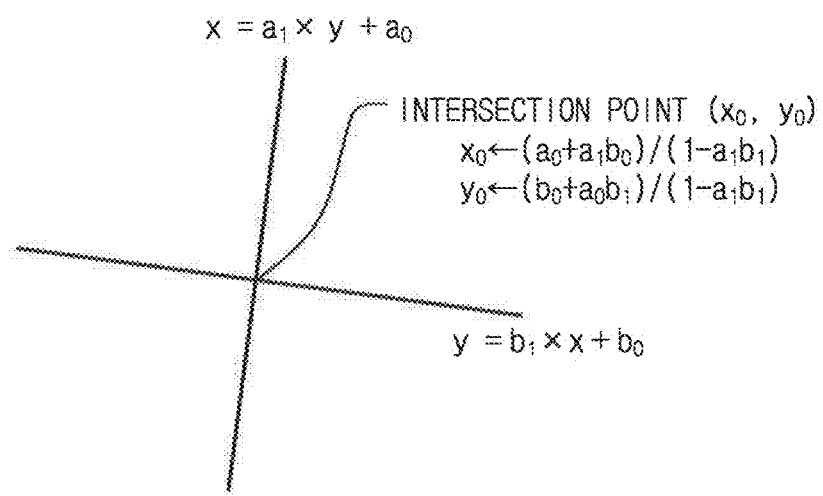
FIG. 27 is a view illustrating the relation between the expressions of two straight lines and the intersection point therebetween.

FIG. 27 shows the relation between the expressions of the two straight lines and the intersection point therebetween. As shown in FIG. 27, the CPU 31 calculates the coordinates of the reference point.

Figure 28:
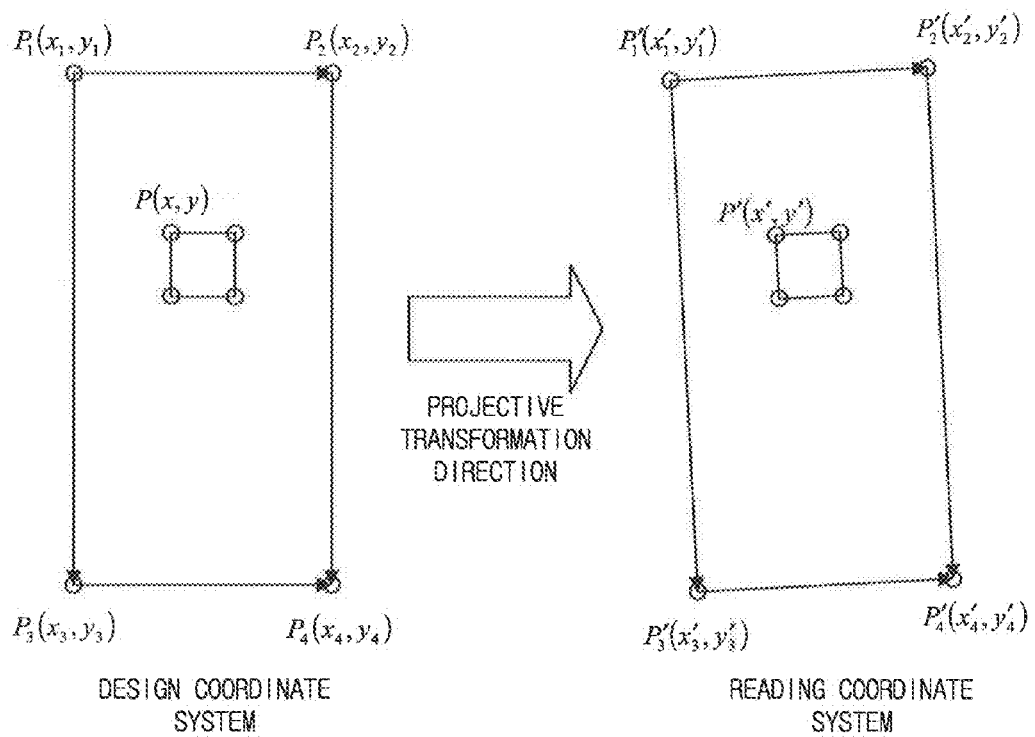
FIG. 28 is an explanatory view illustrating the projective transformation.

Next, the geometric transformation coefficient calculating process (Step S203 in FIG. 8) will be described in detail. As illustrated in FIG. 28, the CPU 31 obtains the projective transformation expressions for projecting the design coordinate system to the reading coordinate system, in accordance with the relation between the position coordinates ($P_1(X_1, Y_1)$, $P_2(X_2, Y_2)$, $P_3(X_3, Y_3)$, $P_4(X_4, Y_4)$) of the reference points at the four corners of the control strip 60 in the design coordinate system and the position coordinates ($P'_1(X'_1, Y'_1)$, $P'_2(X'_2, Y'_2)$, $P'_3(X'_3, Y'_3)$, $P'_4(X'_4, Y'_4)$) in the read image data (the reading coordinate system), which are calculated in Step S202. FIG. 29 shows the calculating expressions for the projective transformation coefficients.

The CPU 31 specifies the position of each patch of the control strip 60 in the reading coordinate system in accordance with the position of each patch of the control strip 60 in the design coordinate system by using the above projective transformation expressions, and calculates the average gradation value of each patch (Step S204 in FIG. 8).

Figure 30:
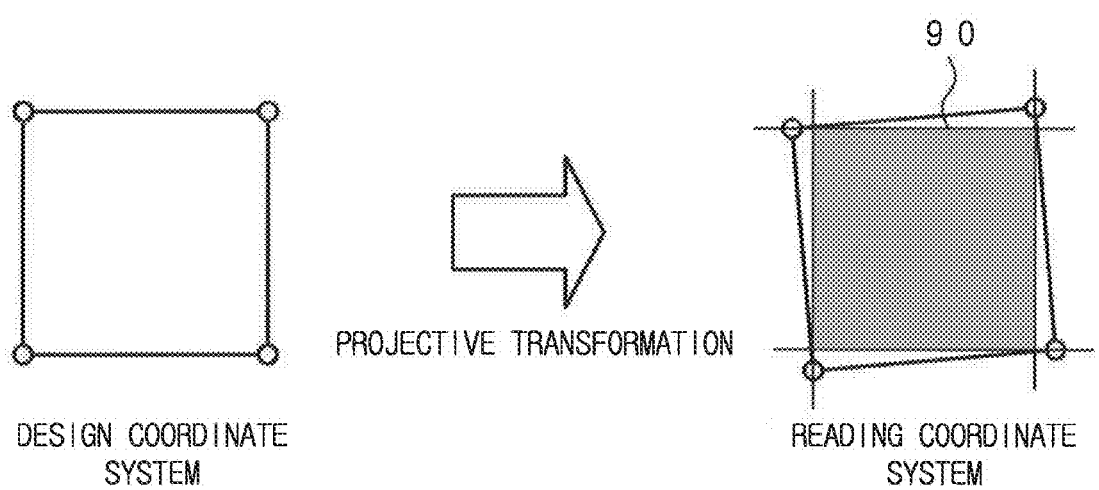
FIG. 30 is a view illustrating the measuring area in the patch region in the reading coordinate system.

Specifically, the CPU 31 transforms the coordinate position of each patch of the control strip 60 in the design coordinate system into the coordinate position in the reading coordinate system by using the projective transformation expressions, and calculates the coordinate position of each patch in the reading coordinate system. Then, the CPU 31 calculates the average value of densities (gradation values) in the region of each patch specified in the reading coordinate system. At this time, as illustrated in FIG. 30, the CPU 31 simplifies the area for measuring the density as an area 90 to be measured, by setting a quadrangle which internally contacts with the region (having a shape of parallelogram or the like) of the patch in the reading coordinate system and which has the respective sides extending in the horizontal direction and in the vertical direction. Then, the CPU 31 calculates the average of the accumulated value of the densities in the area 90 as the density of the patch. Thereby, it is possible to reduce the throughput, and it is possible to more securely prevent the area to be measured from protruding outside the actual patch region.

As described above, according to the embodiment, each of the end patches 61 which are positions at the both ends of the control strip 60 is white or light-colored. The reference point which is defined by two straight lines including the fine line drawn on at least a part of the peripheral, edge of each patch 61 except the border between the end patch 61 and the adjacent patch is provided at each end in the longitudinal direction of the control strip 50. The CPU 31 specifies the position of each reference point which is provided at each end of the control strip 60 with high accuracy from the two straight lines to read each patch in the control strip 60. Thus, the fine lines drawn on the peripheral edge of the patch 61 which is arranged at each end of the control strip 60 are used as the information for specifying the positions of the reference points. Accordingly, an additional reference mark and the like is not required to be arranged in the vicinity of the control strip, an extra space is not required, and a margin region arranged at an end portion of the paper sheet can be effectively used.

Further, according to the embodiment, as long as the control strip 60 is arranged in the vicinity of the end portion of the paper sheet and the information relating to the number of the patches thereof is known, the positions of the patches can be detected even though other specific information such as detailed position information is not available. Furthermore, even though a database relating to the drawing patterns of the control strip is not provided in advance, the above embodiment can be applied to various patterns, and in the embodiment, the control strip having the arbitrary size and the arbitrary number of the patches can be handled as necessary.

Accordingly, the embodiment can be applied to an open system in which a printing apparatus that prints the control strip 60, a reading device that reads the image on the printed paper sheet, and an analyzing device that analyzes patch data from the read image data are independent from one another, and in which the conditions for the printing of the control strip 60, the reading of the image and the like cannot be automatically communicated among the above devices and the like.

The detection of the reference points is performed by combining the detection of the edge position in the vicinity of the approximate end position of the control strip 60 with the accuracy detection of the fine line. Thereby, it is possible to prevent other objects from being erroneously detected.

Further, the reliability in the detection of the reference points can be improved by adjusting the conditions such as the range of the distance between the edge and the fine line and the range of the width of the fine line.

The position of the reference point can be specified, by using a general algorism for the edge detection and the fine line detection in the one-dimensional direction. In this algorism, the processing is relatively light without the pattern matching or the like.

By using one or two characteristic points at each of the patch frames at the both ends of the control strip as the reference point(s), it is possible to determine the geometric transformation parameters that can be applied to the entire control strip, in accordance with the detected positions of the reference points. Thereby, it is not required to determine the closest reference point for each patch. It is possible to perform an appropriate positional correction in accordance with the relative position to the patch, and it is not required to obtain the information relating to the resolution at the printing and the reading.

As described above, the embodiment is explained by using the drawings. However, in the present invention, the concrete configuration is not limited to the above embodiment, in the present invention, various modifications of the above embodiment or the addition of various functions or the like to the embodiment can be carried out without departing from the gist of the invention.

In the printing system 10 according to the embodiment, the printing system is constructed so as to has the function of the printing apparatus that prints the control strip 60 in the end portion of a paper sheet, the function of the reading device that optically reads the image on the printed paper sheet, and the function of the gradation correction device that obtains the density data of each patch by analyzing the read image data to specify the position of each patch from the reference points and generates the gradation correction data, in one apparatus. However, the printing system may be constructed so as to divide these functions into a plurality of separated devices.

For example, the printing apparatus and the reading device are configured in one device, and the gradation correction device is configured as a separated independent device from the printing apparatus and the reading device. The gradation correction device has the function of instructing the printing apparatus to print the control strip 60, the function of inputting the read image data obtained by instructing the reading device to read the image on the paper sheet on which the control strip 60 is printed, and the function of obtaining the density data of each patch by analyzing the read image data to detect the positions of the reference points and to specify the position of each of the patches constituting the control strip 60, and of generating the gradation correction data from the density data. The gradation correction device can be constructed by a processing unit or the like comprising a main unit which has a data input/output I/F (interface), a CPU, a ROM, a RAM, and the like.

Preferably, the reference points are arranged at the four corners of the control strip 60, respectively. However, the same effect can be obtained by providing three reference points. Further, one reference point may be arranged at each of both ends of the control strip. In this case, the reference points are preferably provided at the opposing corners of the control strip. It is not necessary that the reference points are positioned on the peripheral edge of the end patch.

The density of each patch other than the patches arranged at the both ends of the control strip 60 may be arbitrarily set. However, the patch (the second patch from the end) adjacent to the end patch preferably has high density. Particularly, at the end position in the longitudinal direction of the control strip that is firstly detected in the analyzing procedure (3), the adjacent patch preferably has high density in order to perform the edge detection.

In the embodiment, each of the patches has the same shape. However, the patches may have different sizes and shapes, respectively. As long as the sizes and the shapes on the design are known, the region of each patch can be estimated from the reference points in accordance with the sizes and the shapes. A shape of the patch is not limited to a rectangle.

The algorism for the fine line detection and the edge detection, which is described in the embodiment, is exemplified. The present invention is not limited to the above algorism.

The image forming method is not limited to the electrophotographic method which is exemplified in the embodiment. An ink jet method or the like may be used.

One of the objects of the above embodiment is to provide a gradation correction device and a printing system which can read each patch in a control strip precisely without arranging an additional reference mark to generate the gradation correction data.

In the above embodiment, the end patches arranged at both ends of the control strip are white or light-colored and the reference point for detecting the position of the control strip in the read image data is defined by the two straight lines including the fine line drawn on the peripheral edge of each end patch. Because the reference point is defined by the two straight lines including the fine line drawn on the peripheral edge of each end patch, it is not required to additionally arrange a mark or the like for determining the reference point in the vicinity of the control strip or the like. Thereby, the margin positioned at an end portion of a paper sheet can be efficiently used. By using white or light-colored end patches, the fine line can be clearly drawn on the peripheral edge (frame portion) of the end patch. Because the reference point is arranged at each end in the longitudinal direction of the control strip, the position of each patch arranged between these reference points can be precisely specified in accordance with the positions of the above reference points.

In the above embodiment, among the peripheral edge of the end patch, the fine line is drawn on the portion of the side of the control strip, which is arranged on the end position in the longitudinal direction of the control strip. Further, the reference point is defined by the fine line and the peripheral fine line. In other words, the reference point is defined, at the most end position in the longitudinal direction of the control strip among the peripheral edge of the end patch.

In the above embodiment, because the position of each reference point is calculated by gradually limiting an area to be analyzed in each sequence, the position of each reference point can be specified more precisely while the throughput for analyzing the position can be reduced.

In the above embodiment, for example, the first edge position is detected by the analysis from the end portion of the paper sheet in the inside direction of the paper sheet. This edge is an edge which is the border between the end patch and the second patch from the end of the control strip. Next, the fine line which is closest to the above edge is detected. The detected fine line is a fine line drawn at one end in the longitudinal direction of the control strip. By performing the above process, for example, even though a mark such as a crop mark for determining the cutting position is drawn in the vicinity of the outside of the end of the control strip, it is possible to prevent the above mark from being erroneously recognized as the fine line arranged at the end of the control strip. When the distance between the edge and the fine line is found, it is possible to specify the other end position of the control strip in the read image data by referring the design information (for example, the size in the design).

In the above embodiment, the distance between the edge and the fine line corresponds to a size of one patch. Because each patch has the same size, the other end position of the control strip can be estimated from the product of the distance by the number of the patches.

In the above embodiment, because the fine line is a solid line or a dashed line and in the fine line, not less than one third of pixels of the control strip, which are arranged in the width direction are high density pixels, the position of the fine line (for example, the expression of the straight line corresponding to the fine line) can be specified more precisely.

In the above embodiment, when the patch is a rectangle, the perpendicular fine line is drawn on the peripheral edge of the end patch.

In the above embodiment, the frame lines of the rectangular patch function as the two straight lines that define the reference point. In other words, the corners of the frame become the reference points. Because two reference points are defined in each end of the control strip, the reference points are defined at four corners of the control strip.

In the above embodiment, the printing system is constituted so as to include the printing apparatus, the reading device, and the gradation correction device.

According to the gradation correction device and the printing system in the above embodiment, it is possible to read each patch in the control strip precisely without arranging an additional reference mark to generate the gradation correction data, or to perform the gradation correction.

The present U.S. patent application claims the priority of Japanese Patent Application No. 2012-87524, filed on Apr. 6, 2012, according to the Paris Convention, and the above Japanese Patent Application is the basis for correcting mistranslation of the present U.S. patent application.

What is claimed is:

1. A gradation correction device to instruct a printing apparatus to print an image in which a control strip formed by linearly arranging a plurality of patches having different densities is located at an end portion of a paper sheet; to obtain density data of each patch of the control strip by analyzing read image data obtained by instructing a reading device to read the image on the paper sheet; and to generate gradation correction data in accordance with the density data, which is used in, the printing apparatus, wherein the control strip has white or light-colored end patches arranged at both ends in a longitudinal direction of the control strip, and has at least one reference point at each of both end portions of the control strip in the longitudinal direction, the reference point being defined by two straight lines including a fine line drawn on at least a part of a peripheral edge of each end patch except a border between the end patch and an adjacent patch which is adjacent to the end patch, and wherein the gradation correction device detects the reference point at each of the both end portions of the control strip in the read image data, and obtains the density data of each patch by specifying a position of each patch in the control strip in the read image data in accordance with the detected reference point.

2. The gradation correction device of claim 1, wherein the fine line is a straight line that is positioned at each of end positions in the longitudinal direction of the control strip, and that extends in a direction perpendicular to the longitudinal direction, and wherein the reference point is defined as an intersection point between the fine line and a perpendicular fine line which is perpendicular to the fine line, or an intersection point at which an extended line of one of the fine line and the perpendicular fine line intersects with the other line of the fine line and the perpendicular fine line or with an extended line of the other line.

3. The gradation correction device of claim 2, wherein the gradation connection device detects the reference point in accordance with a detecting method comprising:

calculating approximate end positions in a width direction of the control strip, the width direction being perpendicular to the longitudinal direction;

specifying the end positions in the longitudinal direction of the control strip by analyzing an area in the width direction, the area being defined by the calculated approximate end positions;

specifying end positions in the width direction of the control strip by analyzing areas in vicinity of the specified end positions in the longitudinal direction; and specifying each position of the reference points in accordance with each position of four corners of the control strip, which are determined by the specified end positions in the width direction and the specified end positions in the longitudinal direction.

4. The gradation correction device of claim 3, wherein the specifying of the end positions in the longitudinal direction is carried out by:

detecting a position of an edge in the control strip, in vicinity of one end position in the longitudinal direction of the control strip;

detecting a position of the fine line which is closest to the detected position of the edge; and approximately estimating the other end position in the longitudinal direction of the control strip in accordance with a distance between the detected position of the edge and the detected position of the fine line, and design information of the control strip.

5. The gradation correction device of claim 4, wherein each of the patches constituting the control strip has a same size, and wherein the design information includes the number of the patches constituting the control strip, and the gradation correction device approximately estimates the other end position of the control strip in accordance with the distance and the number of the patches.

6. The gradation correction device of claim 2, wherein the fine line is a solid line or a dashed line, and in the fine line, not less than one third of pixels of the control strip, which are arranged in the width direction, are high density pixels.

7. The gradation correction device of claim 2 wherein the perpendicular fine line is positioned at an end position in a width direction of the control strip.

8. The gradation correction device of claim 2, wherein the fine line and two of the perpendicular fine lines form frame lines of each end patch of the control strip.

9. A printing system comprising:

a gradation correction device to instruct a printing apparatus to print an image in which a control strip formed by linearly arranging a plurality of patches having different densities is located at an end portion of a paper sheet; to obtain density data of each patch of the control strip by analyzing read image data obtained by instructing a reading device to read the image on the paper sheet; and to generate gradation correction data in accordance with the density data, which is used in the printing apparatus the printing apparatus to perform gradation correction in printing of the image, in accordance with the gradation correction data generated by the gradation correction device; and the reading device to optically read the image on the paper sheet, wherein the gradation correction device instructs the printing apparatus to print the image in which the control strip is located at the end portion of the paper sheet, and obtains the read image data of the paper sheet from the reading device, wherein the control strip has white or light-colored end patches arranged at both ends in a longitudinal direction of the control strip, and has at least one reference point at each of both end portions of the control strip in the longitudinal direction, the reference point being defined by two straight lines including a fine line drawn on at least a part of a peripheral edge of each end patch except a border between the end patch and an adjacent patch which is adjacent to the end patch, and wherein the gradation correction device detects the reference point at each of the both end portions of the control strip in the read image data, and obtains the density data of each patch by specifying a position of each patch in the control strip in the read image data in accordance with the detected reference point.

10. The printing system of claim 9, wherein the fine line is a straight line that is positioned at each of end positions in the longitudinal direction of the control strip, and that extends in a direction perpendicular to the longitudinal direction, and wherein the reference point is defined as an intersection point between the fine line and a perpendicular fine line which is perpendicular to the fine line, or an intersection point at which an extended line of one of the fine line and the perpendicular fine line intersects with the other line of the fine line and the perpendicular fine line or with an extended line of the other line.

11. The printing system of claim 10, wherein the gradation connection device detects the reference point in accordance with a detecting method comprising:

calculating approximate end positions in a width direction of the control strip, the width direction being perpendicular to the longitudinal direction;

specifying the end positions in the longitudinal direction of the control strip by analyzing an area in the width direction, the area being defined by the calculated approximate end positions;

specifying end positions in the width direction of the control strip by analyzing areas in vicinity of the specified end positions in the longitudinal direction; and specifying each position of the reference points in accordance with each position of four corners of the control strip, which are determined by the specified end positions in the width direction and the specified end positions in the longitudinal direction.

12. The printing system of claim 11, wherein the specifying of the end positions in the longitudinal direction is carried out by:

detecting a position of an edge in the control strip, in vicinity of one end position in the longitudinal direction of the control strip;

detecting a position of the fine line which is closest to the detected position of the edge; and approximately estimating the other end position in the longitudinal direction of the control strip in accordance with a distance between the detected position of the edge and the detected position of the fine line, and design information of the control strip.

13. The printing system of claim 12, wherein each of the patches constituting the control strip has a same size, and wherein the design information includes the number of the patches constituting the control strip, and the gradation correction device approximately estimates the other end position of the control strip in accordance with the distance and the number of the patches.

14. The printing system of claim 10, wherein the fine line is a solid line or a dashed line, and in the fine line, not less than one third of pixels of the control strip, which are arranged in the width direction, are high density pixels.

15. The printing system of claim 10, wherein the perpendicular fine line is positioned at an end position in a width direction of the control strip.

16. The printing system of claim 10, wherein the fine line and two of the perpendicular fine lines form frame lines of each end patch of the control strip.

\* \* \* \* \*